United States Patent
Tsujita

(10) Patent No.: US 10,354,174 B2
(45) Date of Patent: Jul. 16, 2019

(54) IMAGE PROCESSING APPARATUS, IMAGE FORMING APPARATUS, METHOD OF CONTROLLING IMAGE PROCESSING APPARATUS, AND METHOD OF CONTROLLING IMAGE FORMING APPARATUS

(71) Applicant: CANON KABUSHIKI KAISHA, Tokyo (JP)

(72) Inventor: Kosuke Tsujita, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/852,075

(22) Filed: Dec. 22, 2017

(65) Prior Publication Data

US 2018/0181845 A1  Jun. 28, 2018

(30) Foreign Application Priority Data

Dec. 28, 2016 (JP) .................. 2016-255520

(51) Int. Cl.
*G06K 15/02* (2006.01)
*G06K 15/14* (2006.01)
(Continued)

(52) U.S. Cl.
CPC ......... *G06K 15/027* (2013.01); *G06F 3/1208* (2013.01); *G06F 3/1218* (2013.01); *G06F 3/1267* (2013.01); *G06F 3/1288* (2013.01); *G06K 15/007* (2013.01); *G06K 15/14* (2013.01); *G06K 15/188* (2013.01); *G06K 15/4065* (2013.01); *H04N 1/00015* (2013.01); *H04N 1/00023* (2013.01); *H04N 1/00058* (2013.01); *H04N 1/00087* (2013.01); *H04N 1/00875* (2013.01); *G06F 3/126* (2013.01); *G06F 3/1239* (2013.01); *G06F 3/1244* (2013.01); *H04N 2201/0082* (2013.01)

(58) Field of Classification Search
CPC .................................... G06K 15/027
USPC ...................................... 358/1.15
See application file for complete search history.

(56) References Cited

U.S. PATENT DOCUMENTS

| | | | |
|---|---|---|---|
| 6,280,105 B1 * | 8/2001 | Iida | G06K 15/00 400/61 |
| 2014/0160498 A1 * | 6/2014 | Yano | G06F 3/1208 358/1.9 |
| 2014/0313529 A1 * | 10/2014 | Nakashio | G06K 15/027 358/1.9 |

FOREIGN PATENT DOCUMENTS

JP   2014113810 A   6/2014

* cited by examiner

*Primary Examiner* — Jacky X Zheng
(74) *Attorney, Agent, or Firm* — Rossi, Kimms & McDowell LLP

(57) ABSTRACT

An image forming system capable of preserving appropriate density-gradation characteristics and color output characteristics. An image processing apparatus for executing second calibration is connected to an image forming apparatus for executing first calibration. When an instruction for executing the second calibration in succession to execution of the first calibration is received, the image processing apparatus transmits an inhibition command for inhibiting a print operation to the image forming apparatus, and shifts to an inhibition mode. The image processing apparatus transmits a cancel command for canceling inhibition of the print operation to the image forming apparatus. Even when an instruction for executing the job is received, the image processing apparatus does not transmit the job to the image forming apparatus during the inhibition mode.

9 Claims, 17 Drawing Sheets

(51) Int. Cl.
*G06F 3/12* (2006.01)
*G06K 15/00* (2006.01)
*H04N 1/00* (2006.01)

FIG. 3A

| | 301 |
|---|---|
| FIRST CALIBRATION | |
| SETTING | SHEET |
| CALIBRATION 1 | THIN PAPER/PLAIN PAPER/ THICK PAPER 1 - 4 |
| CALIBRATION 2 | THICK PAPER 5 |
| CALIBRATION 3 | THICK PAPER 6 |

| | 311 |
|---|---|
| SECOND CALIBRATION | |
| SETTING | SHEET |
| PLAIN PAPER | STANDARD SHEET A (PLAIN PAPER) |
| THICK PAPER | STANDARD SHEET B (THICK PAPER) |
| COATED PAPER | STANDARD SHEET C (COATED PAPER) |
| THICKEST PAPER | STANDARD SHEET D (THICKEST PAPER) |
| THICKEST COATED PAPER | STANDARD SHEET E (THICKEST COATED PAPER) |
| USER SHEET A | USER SHEET A |
| USER SHEET B | USER SHEET B |

| SYSTEM CALIBRATION | SECOND CALIBRATION | FIRST CALIBRATION | |
|---|---|---|---|
| SETTING NAME | SETTING | SETTING | LAST EXECUTION TIME |
| PLAIN PAPER | PLAIN PAPER | CALIBRATION 1 | 20XX/YY/ZZ |
| THICK PAPER | THICK PAPER | CALIBRATION 2 | 20XX/YY/ZZ |
| COATED PAPER | COATED PAPER | CALIBRATION 2 | 20XX/YY/ZZ |
| THICKEST PAPER | THICKEST PAPER | CALIBRATION 3 | 20XX/YY/ZZ |
| THICKEST COATED PAPER | THICKEST COATED PAPER | CALIBRATION 3 | 20XX/YY/ZZ |
| USER SHEET A | USER SHEET A | CALIBRATION 1 | 20XX/YY/ZZ |
| USER SHEET B | USER SHEET B | CALIBRATION 2 | 20XX/YY/ZZ |

IMAGE PROCESSING APPARATUS, IMAGE FORMING APPARATUS, METHOD OF CONTROLLING IMAGE PROCESSING APPARATUS, AND METHOD OF CONTROLLING IMAGE FORMING APPARATUS

BACKGROUND OF THE INVENTION

Field of the Invention

The present invention relates to a technique for performing calibration in an image processing apparatus and an image forming apparatus.

Description of the Related Art

In recent years, generally, an electrophotographic image forming apparatus for commercial printing is connected to an image processing apparatus that aims to increase the added value to form a printing system (image forming system). To stabilize the quality of images delivered from this system, the image forming apparatus and the image processing apparatus each have an adjustment function (calibration function). The calibration function is a function for adjusting functions of each apparatus so as to obtain predetermined optimum output of toner or ink components for forming an image on a printout. In general, each apparatus has a lookup table (LUT) for converting an input signal value of each toner or ink component to an optimum output signal value thereof, and by correcting this LUT which is used when executing print data processing, the calibration function is realized. Each apparatus holds information to be targeted so as to form the LUT.

The purposes and conditions of the optimum output vary with the role of each apparatus. The calibration function of the image forming apparatus aims to optimize image forming conditions, such as applied voltage and laser power. On the other hand, the calibration function of the image processing apparatus aims to generate optimum image processing parameters according to conditions including a type of print sheet. Before processing a print job, each apparatus is required to perform correction of the LUT using its calibration function, i.e. calibration, and the calibration functions of the apparatuses are provided independently of each other.

To stabilize the quality of images delivered from the whole system, it is necessary to properly perform calibration of each of the image forming apparatus and the image processing apparatus. Further, in a commercial printing field in which deliverables become commercial products, stable image quality is critically important, and hence in many cases, calibration of theses apparatuses is performed with high frequency.

Normally, for the calibration function of each apparatus, a plurality of target information items are held according to the image formation conditions or the conditions including types of print sheets, and are managed as calibration setting information in association with the image formation conditions, sheet information, and the like. Appropriate calibration setting information is different between print jobs. An operator who uses the printing system performs calibration of each of the apparatuses, separately, according to a type of a print job. To reduce human errors in operations performed by the operator for adjusting the whole printing system, several methods have conventionally been proposed. For example, Japanese Laid-Open Patent Publication (Kokai) No. 2014-113810 has proposed the following method: The image forming apparatus performs calibration, and then analyzes results of the calibration to judge whether or not it is necessary to perform calibration of the image processing apparatus. According to the result of the judgment, the image processing apparatus notifies the operator that calibration of the image processing apparatus should be executed, thereby prompting the operator to perform calibration operation of the image processing apparatus.

Further, generally, on condition that a predetermined number of sheets are printed or the amount of used toner exceeds a predetermined value, the image forming apparatus performs adjustment for making the image quality close to a state obtained by calibration, without using a sheet, i.e. stabilization control including registration correction and correction of the amount of laser light. This makes it possible to keep the quality of printed images close to an ideal state for a long time.

However, the method proposed by Japanese Laid-Open Patent Publication (Kokai) No. 2014-113810 assumes an environment in which the image adjustment is executed in both the apparatuses, independently of each other, according to the configuration of the conventional printing system. Therefore, the workload of an operator who performs calibration of both the apparatuses does not change from before, and the determination of whether or not to actually perform the suggested calibration sometimes depends on determination by the operator. Therefore, since the workload of adjustment of the whole printing system by the operator is not reduced, and it is up to operator's judgment whether or not to execute calibration, there still remains a possibility of occurrence of a human error.

Further, according to the method proposed by Japanese Laid-Open Patent Publication (Kokai) No. 2014-113810, printing which is not associated with the calibration functions is not inhibited during an interval between calibration operations in both the apparatuses. Therefore, printing which is not associated with the calibration functions can be executed during an interval after execution of calibration of the image forming apparatus and before execution of calibration of the image processing apparatus. Here, printing which is not associated with the calibration function refers to printing without using a LUT to be corrected by calibration, for example, a print operation of the image forming apparatus for copy or the like. If such a print operation which is not associated with the calibration function is repeated in the image forming apparatus after execution of calibration, the amount of toner or ink with respect to applied voltage changes e.g. due to aging of toner or ink. If calibration of the image processing apparatus is performed in this state, the calibration is performed based on a state of the image forming apparatus in which the amount of toner or ink with respect to applied voltage has changed. As mentioned above, when a predetermined condition is satisfied, the image forming apparatus executes the stabilization control for making the image quality close to a state obtained by calibration. This changes the state of the image forming apparatus different with respect to the state of the image processing apparatus obtained by calibration, and hence density-gradation characteristics and color output characteristics of the printing system fail to meet expected values. As described above, if printing which is not associated with calibration is performed at an interval between the image adjustment operations in the image forming apparatus and the image processing apparatus, there is a fear that it is impossible to maintain image quality characteristics, such as density-gradation characteristics and color output characteristics of the printing system, in an appropriate state.

SUMMARY OF THE INVENTION

The present invention provides an image processing apparatus, an image forming apparatus, a method of controlling the image processing apparatus, and a method of controlling the image forming apparatus, which are capable of preserving image quality characteristics, such as proper density-gradation characteristics and color output characteristics, of an image forming system formed by the image processing apparatus and the image forming apparatus, in an appropriate state.

In a first aspect of the present invention, there is provided an image processing apparatus that is connected to an image forming apparatus that executes first calibration, the image processing apparatus executing second calibration, comprising a reception unit configured to receive an instruction for executing the second calibration in succession after the first calibration is executed, a first transmission unit configured to transmit, according to reception of the instruction by the reception unit, an inhibition command for inhibiting at least a print operation to be performed based on an instruction for executing a job, to the image forming apparatus, a control unit configured to shift, according to the reception of the instruction by the reception unit, an operation mode to an inhibition mode, and a second transmission unit configured to transmit a cancel command for canceling inhibition of the print operation by the inhibition command, to the image forming apparatus, wherein during the inhibition mode, even when an instruction for executing the job is received, the control unit does not transmit the job to the image processing apparatus.

In a second aspect of the present invention, there is provided an image forming apparatus that executes first calibration, and is connected to an image processing apparatus that executes second calibration, comprising a first reception unit configured to receive an inhibition command for inhibiting, even when execution of a job is instructed, at least a print operation to be performed based on the job, from the image processing apparatus, a control unit configured to shift an operation mode to an inhibition mode according to reception of the inhibition command by the first reception unit, and a second reception unit configured to receive a cancel command for canceling inhibition of a print operation by the inhibition command, from the image processing apparatus, wherein even when execution of the job is instructed to the image forming apparatus, the control unit does not execute the at least the print operation to be performed based on the job, during the inhibition mode.

In a third aspect of the present invention, there is provided a method of controlling an image processing apparatus that is connected to an image forming apparatus that executes first calibration, the image processing apparatus executing second calibration, comprising receiving an instruction for executing the second calibration in succession after the first calibration is executed, transmitting, according to reception of the instruction, an inhibition command for inhibiting at least a print operation to be performed based on an instruction for executing a job, to the image forming apparatus, shifting, according to the reception of the instruction, an operation mode to an inhibition mode, transmitting a cancel command for canceling inhibition of the print operation by the inhibition command, to the image forming apparatus, and not transmitting, during the inhibition mode, even when an instruction for executing the job is received, the job to the image processing apparatus.

In a fourth aspect of the present invention, there is provided a method of controlling an image forming apparatus that executes first calibration, and is connected to an image processing apparatus that executes second calibration, comprising receiving an inhibition command for inhibiting, even when execution of a job is instructed, at least a print operation to be performed based on the job, from the image processing apparatus, shifting an operation mode to an inhibition mode according to reception of the inhibition command, receiving a cancel command for canceling inhibition of a print operation by the inhibition command, from the image processing apparatus, and not executing, even when execution of the job is instructed to the image forming apparatus, the at least the print operation to be performed based on the job, during the inhibition mode.

According to the present invention, it is possible to preserve the image quality characteristics, such as density-gradation characteristics and color output characteristics, of the image forming system, in an appropriate state.

Further features of the present invention will become apparent from the following description of exemplary embodiments (with reference to the attached drawings).

BRIEF DESCRIPTION OF THE DRAWINGS

FIG. 3A is a diagram showing an example of first calibration setting information.

FIG. 3B is a diagram showing an example of second calibration setting information.

FIG. 6 is a diagram showing an example of system calibration setting information.

DESCRIPTION OF THE EMBODIMENTS

The present invention will now be described in detail below with reference to the accompanying drawings showing embodiments thereof.

Figure 1:
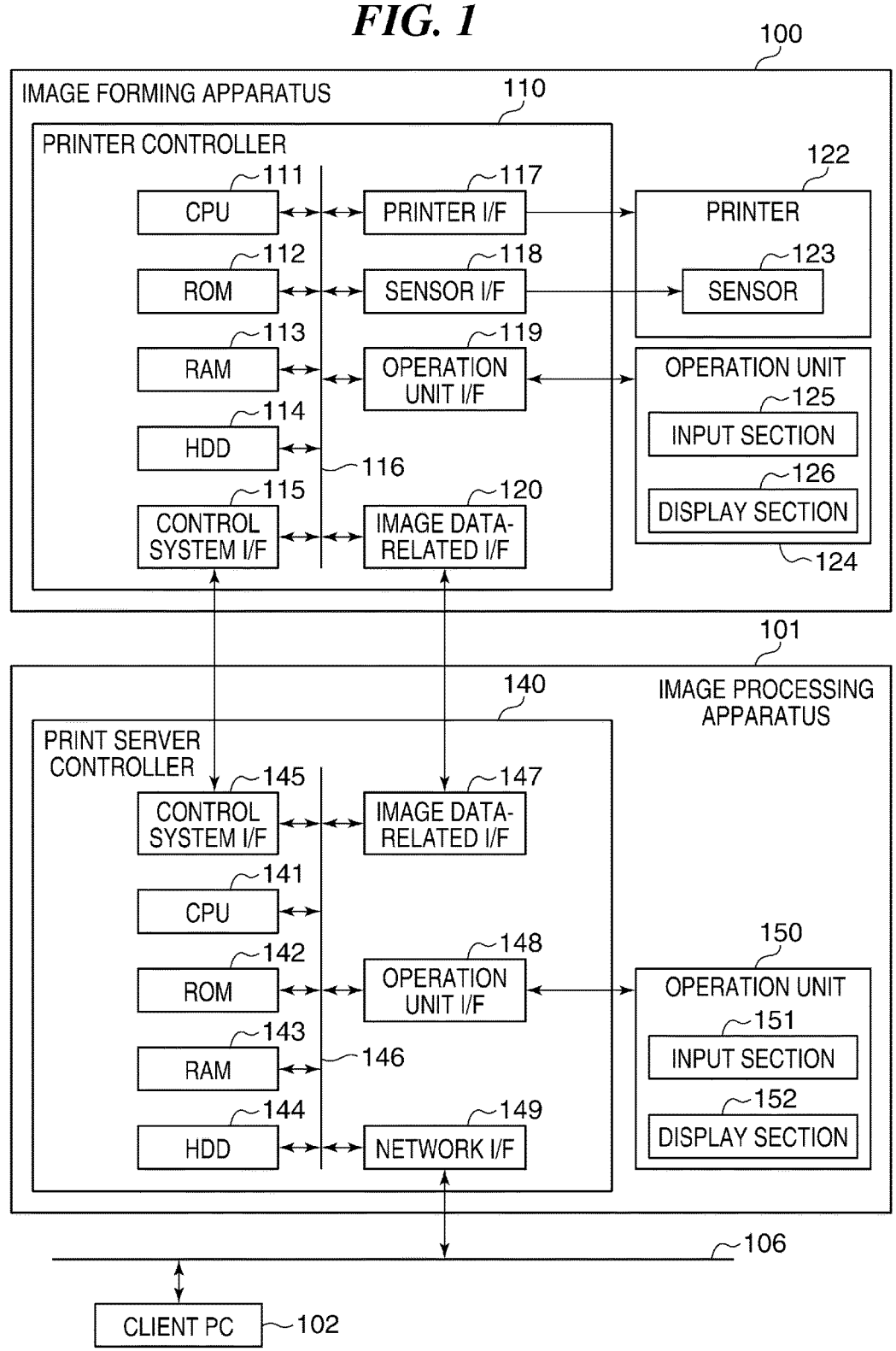
FIG. 1 is a block diagram showing a hardware configuration of an image forming system according to a first embodiment of the present invention.

FIG. 1 is a block diagram showing a hardware configuration of an image forming system according to a first embodiment of the present invention. This image forming system is a printing system comprised of an image processing apparatus 101 and an image forming apparatus 100, which are communicably connected to each other. In the following description, calibration performed by the image forming apparatus 100 is referred to as the first calibration, and calibration performed by the image processing apparatus 101 is referred to as the second calibration. Further, the first calibration and the second calibration performed sequentially by the whole image forming system in a coordinated fashion is referred to as the system calibration.

The image forming apparatus 100 includes a printer controller 110. A CPU 111 of the printer controller 110 performs centralized control of accesses to various devices connected to a system bus 116, based on a control program stored in a ROM 112 or a hard disk (HDD) 114. The ROM 112 stores control programs and the like which can be executed by the CPU 111. A RAM 113 mainly functions as a main memory, a work area, etc., for the CPU 111, and is capable of having its memory capacity expanded by an option RAM connected to an expansion port, not shown. The hard disk (HDD) 114 stores a boot program, various application programs, font data, user files, edited files, etc. Note that not only the hard disk, but also an SD card, a flash memory, or the like may be used as the external storage device. A control system interface 115 transmits and receives information necessary for print control to and from the image processing apparatus 101. A printer interface 117 controls output of images to a printer 122. An operation unit interface 119 controls the display of a display section 126 included in an operation unit 124, and controls inputting of various setting information set via an input section 125. An image data-related interface 120 receives image data to be transmitted to the printer 122 from the image processing apparatus 101. A sensor interface 118 transmits an operation instruction to a sensor 123 disposed within the printer 122, and receives a result of measurement of the sensor 123 therefrom. The sensor 123 is disposed between a fixing device and a discharge outlet (neither of which is shown) on a sheet conveying path of the printer 122. A measurement chart is printed on which a color pattern image (color patch) is arranged in a manner adjusted to the disposed position of the sensor, and when the measurement chart passes the sensor 123, the sensor 123 measures information of the patch, such as spectral values, chromaticity values, and densities. The measured information is used for adjustment functions (calibration functions) of both the apparatuses.

In the image processing apparatus 101, a print server controller 140 performs processing necessary for execution of print processing by the image processing apparatus 101, such as processing for analyzing a print job input thereto, and processing for rasterization into image data. A CPU 141 performs centralized control of accesses to various devices connected to a system bus 146, based on a control program stored in a ROM 142 or a hard disk (HDD) 144. The ROM 142 stores control programs and the like which can be executed by the CPU 141. A RAM 143 mainly functions as a main memory, a work area, etc., for the CPU 141, and is capable of having its memory capacity expanded by an option RAM connected to an expansion port, not shown. The hard disk (HDD) 144 stores a boot program, various application programs, font data, user files, edited files, etc. Note that not only the hard disk, but also an SD card, a flash memory, or the like may be used as the external storage device. A control system interface 145 transmits and receives information necessary for print control to and from the image forming apparatus 100. An image data-related interface 147 transmits image data to be output from the printer 122 to the image forming apparatus 100. An operation unit interface 148 controls the display of a display section 152 included in an operation unit 150, and controls inputting of various setting information set via an input section 151. A network interface 149 performs data communication with a network 106 via a network cable.

A client PC 102 is connected to the image processing apparatus 101 via the network 106. The client PC 102 inputs a print job to the image processing apparatus 101. Note that the client PC 102 may also be connected to the image forming apparatus 100 via the network 106, and in this case, the client PC 102 can input a print job to the image forming apparatus 100.

Figure 2A:
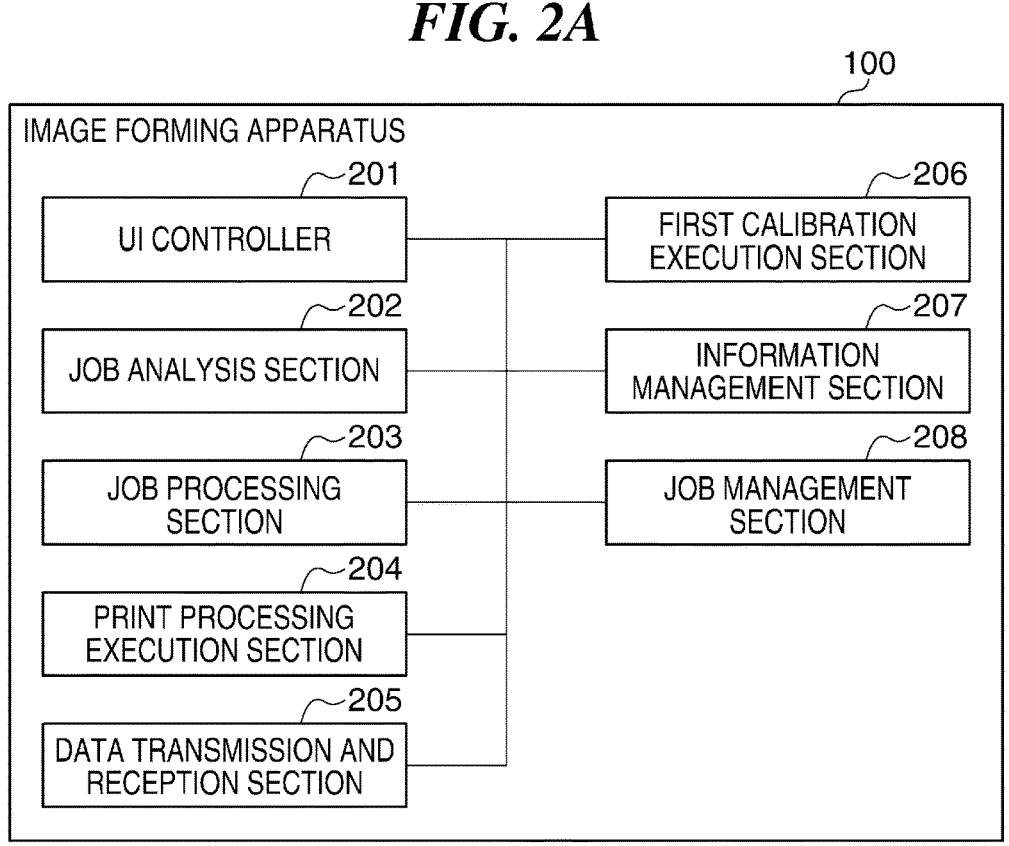
FIG. 2A is a block diagram of software modules of an image forming apparatus.
Figure 2B:
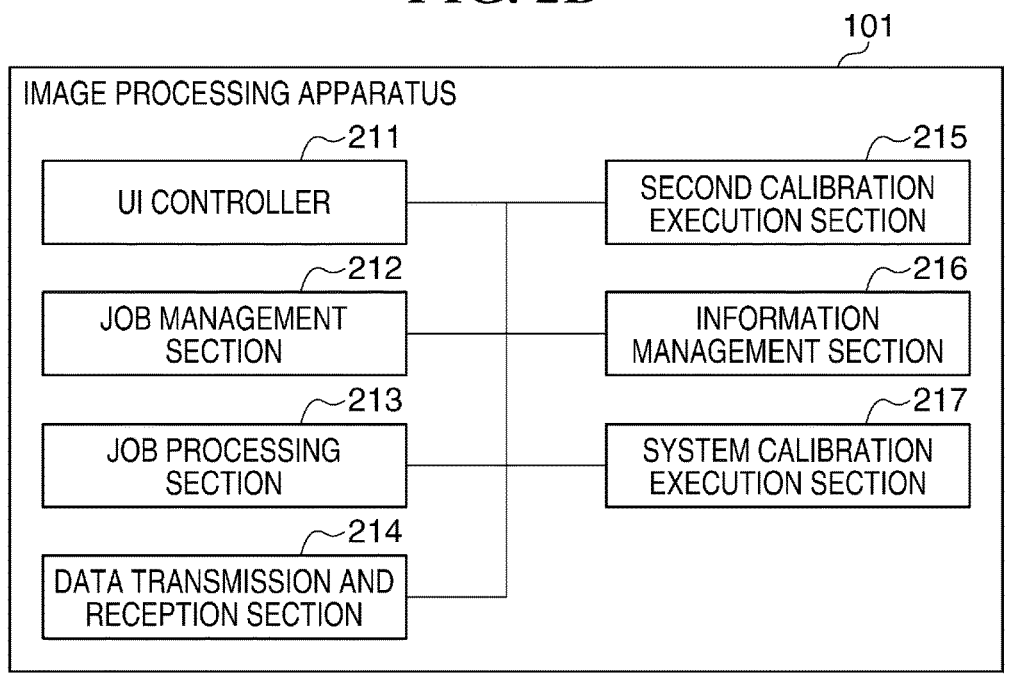
FIG. 2B is a block diagram of software modules of an image processing apparatus.

FIG. 2A is a block diagram of software modules of the image forming apparatus 100. The software modules (see FIG. 2A) of the image forming apparatus 100 are stored in the HDD 114 as programs, and are executed by the CPU 111 that loads the programs into the RAM 113. FIG. 2B is a block diagram of software modules of the image processing apparatus 101. The software modules (see FIG. 2B) of the image processing apparatus 101 are stored in the HDD 144 as programs, and are executed by the CPU 141 that loads the programs into the RAM 143.

First, as shown in FIG. 2A, in the image forming apparatus 100, a UI controller 201 controls the display of the display section 126 on the operation unit 124 via the operation unit interface 119, and controls inputting of various setting information set via the input section 125. A job analysis section 202 analyzes data of a print job received from the image processing apparatus 101. A job processing section 203 performs print processing required to be performed by the image processing apparatus 101 for a print job, and for example, the job processing section 203 performs halftone processing, application of a result of the first calibration, described hereinafter, and so on. A print processing execution section 204 controls a series of print processing operations performed for a print job, such as sheet feeding, sheet conveying, printing, and sheet discharging. A data transmission and reception section 205 controls data transmission and reception to and from the image processing apparatus 101. The data to be transmitted and received includes data of a print job, a result of measurement of the sensor 123, system calibration setting information 601 (see FIG. 6), described hereinafter, and so forth.

A first calibration execution section 206 (hereinafter abbreviated to the execution section 206) controls the calibration function of the image forming apparatus 100. Details of the control of the calibration function will be described hereinafter. An information management section 207 manages information necessary for a first calibration process performed by the image forming apparatus 100. More specifically, the necessary information includes first calibration setting information for the first calibration process, system calibration setting information for a system calibration process, described hereinafter, and so forth. Further, the information management section 207 manages correction target information used when the first calibration process is executed, and information of a correction LUT generated by executing the first calibration process.

A job management section 208 manages data of a print job received from an operator (user), and manages whether or not to inhibit execution of a job other than a calibration job. Here, the job other than the calibration job refers to a job for printing data other than a chart used for calibration, including a copy job, and corresponds to print jobs other than a print job required to perform calibration. Hereinafter, the job other than the calibration job is referred to as the "non-calibration job". More specifically, the job management section 208 performs processing, such as checking whether or not to execute a print job stored in the HDD 114, calling a print job, reflecting a print job setting changed by an operator, managing the history of jobs already printed, and so forth.

As shown in FIG. 2B, in the image processing apparatus 101, a UI controller 211 controls the display of the display section 152 on the operation unit 150 via the operation unit interface 148, and controls inputting of various setting information set via the input section 151. A job management section 212 manages data of a print job received from an operator, and manages whether or not to inhibit execution of a job other than the calibration job (the non-calibration job). More specifically, the job management section 212 performs processing, such as checking whether or not to execute a print job stored in the HDD 144, calling a print job, reflecting a print job setting changed by the operator, managing the history of jobs already printed, and so forth.

A job processing section 213 performs processing necessary for execution of print processing, such as processing for analyzing a print job received from the operator, rasterization into image data, and image compression and decompression, and performs processing for applying the second calibration, described hereinafter. A data transmission and reception section 214 manages data transmission and reception to and from the image forming apparatus 100. The data transmission and reception section 214 transmits print job data generated by the job processing section 213 to the image forming apparatus 100. Further, the data transmission and reception section 214 also manages data transmission and reception to and from the client PC 102 connected to the image processing apparatus 101 via the network 106.

A second calibration execution section 215 (hereinafter abbreviated to the execution section 215) controls the calibration function of the image processing apparatus 101 in a coordinated fashion with the image forming apparatus 100. Details of the control of the calibration function will be described hereinafter. An information management section 216 manages information necessary for the second calibration process performed by the image processing apparatus 101. More specifically, the necessary information includes second calibration setting information for the second calibration process, the system calibration setting information for the system calibration process, described hereinafter, and so forth. Further, the information management section 216 manages correction target information used when the second calibration process is executed, and information of a correction LUT generated by executing the second calibration process.

The software modules (see FIG. 2B) of the image processing apparatus 101 function as a first transmission unit, a first control unit, and a second transmission unit of the present invention. The software modules (see FIG. 2A) of the image forming apparatus 100 function as a first reception unit, a second control unit, and a second reception unit of the present invention.

FIG. 3A is a diagram showing an example of the first calibration setting information managed by the information management section 207 of the image forming apparatus 100. The first calibration setting information, denoted by reference numeral 301, is stored in the HDD 114 of the image forming apparatus 100. The first calibration setting information 301 contains a number of first calibration settings 302 to be managed, which correspond to a number of correction targets required to be switched therebetween according to the image formation conditions, and in the case of the illustrated example, there are three different first calibration settings. First calibration sheet information 303 indicates information on sheets as a print condition associated with each first calibration setting. The information management section 207 manages, in association with each first calibration setting 302, the first calibration sheet information 303, first calibration correction target information, and first calibration correction LUT information.

FIG. 3B is a diagram showing an example of the second calibration setting information managed by the information management section 216 of the image processing apparatus 101. The second calibration setting information, denoted by reference numeral 311, is stored in the HDD 144 of the image processing apparatus 101. The second calibration setting information 311 includes a number of second calibration settings 312 to be managed, which correspond to a number of correction targets required to be switched therebetween according to a condition, such as a print sheet, and in the case of the illustrated example, there are seven different second calibration settings. Second calibration sheet information 313 indicates information on sheets as a print condition associated with each second calibration setting. The information management section 216 manages, in association with each second calibration setting 312, the second calibration sheet information 313, second calibration correction target information, and second calibration correction LUT information. The second calibration settings 312 include ones registered in advance, and ones added by an operator later. The information management section 216 receives a name, sheet information, and correction target information of a second calibration setting which an operator desired to add, via the operation unit 150, and additionally registers the received information in the second calibration setting 312.

A system calibration execution section 217 (hereinafter abbreviated to the execution section 217) of the image processing apparatus 101 controls the calibration function of the whole image forming system. Both of the image processing apparatus 101 and the image forming apparatus 100 cooperate to control the first calibration and the second calibration in a coordinated fashion, and perform control for inhibiting or restricting execution of a non-calibration job during the system calibration. Details of the control will be described hereinafter.

Next, the second calibration process will be described with reference to FIGS. 4A and 4B. In the second calibration process, the image processing apparatus 101 and the image forming apparatus 100 perform respective associated parts of the second calibration process, and hence the parts will be sequentially described with reference to flowcharts shown in FIGS. 4A and 4B.

Figure 4A:
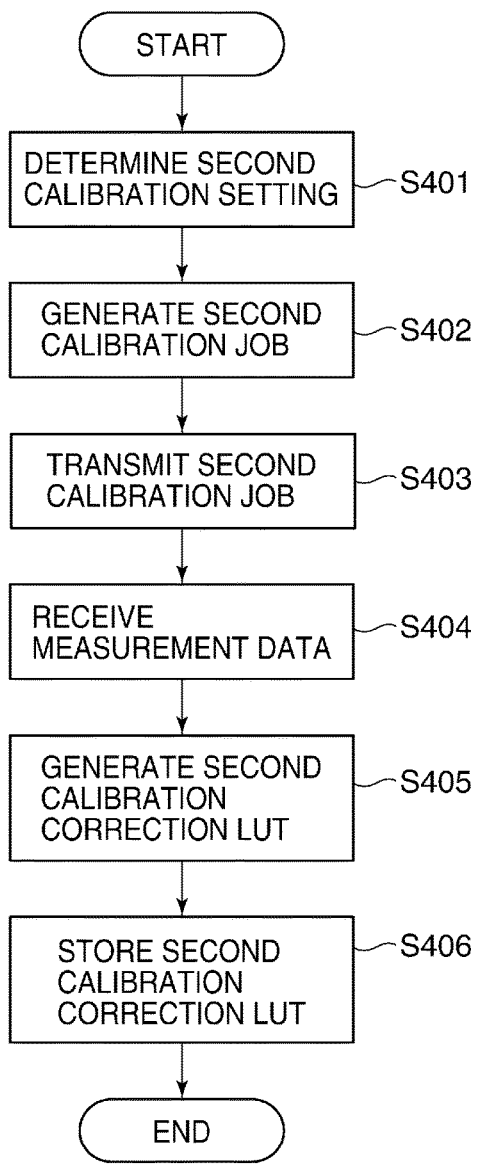
FIG. 4A is a flowchart of a second calibration process performed by the image processing apparatus.

FIG. 4A is a flowchart of a second calibration process performed by the image processing apparatus 101. This second calibration process in FIG. 4A is realized by the CPU 141 executing an associated program stored in the HDD 144 of the image processing apparatus 101 and loaded into the RAM 143. The second calibration process is started in response to reception of a second calibration execution instruction by the execution section 215. The execution instruction is input, for example, by an operator via the input section 151 on the operation unit 150 of the image processing apparatus 101. Further, the execution instruction may be input from an operation unit, not shown, of the client PC 102 connected to the image processing apparatus 101 via the network 106. The execution instruction to be received is information which is necessary to start execution of the second calibration process, and specifies, out of the plurality of second calibration settings, one to be applied. For example, the necessary information includes designation of the second calibration setting 312.

First, in a step S401, the execution section 215 determines a second calibration setting based on the input information received as the second calibration execution instruction. That is, the execution section 215 checks the received input information against the information of the second calibration settings 312 (see FIG. 3B) managed by the information management section 216, and finally determines the second calibration setting. In a step S402, the execution section 215 generates a print job for forming a measurement page for the second calibration. The print job generated in this step is a job for printing a plurality of patterns of images different in signal values which are readable by the sensor 123 of the image forming apparatus 100, in a properly arranged state. These image patterns are printed so as to grasp a state of the printer 122 of the image forming apparatus 100 under a print condition set by the second calibration setting. The image patterns and the information of the print job are stored in the HDD 144, and are read into the RAM 143 by the CPU 141 when the CPU 141 uses them.

In a step S403, after the job processing section 213 performs necessary processing on the generated second calibration job, the execution section 215 transmits the processed second calibration job to the image forming apparatus 100 via the data transmission and reception section 214. In a step S404, the execution section 215 receives measurement data transmitted from the image forming apparatus 100, via the data transmission and reception section 214, after the image forming apparatus 100 performs processing, described hereinafter. In a step S405, the execution section 215 generates a second calibration correction LUT using the received measurement data and correction target information. In a step S406, the execution section 215 stores the second calibration correction LUT generated in the step S405 in the HDD 144, and notifies the information management section 216 of information of the second calibration correction LUT. The information management section 216 manages the information of the second calibration setting based on the notified information.

Figure 4B:
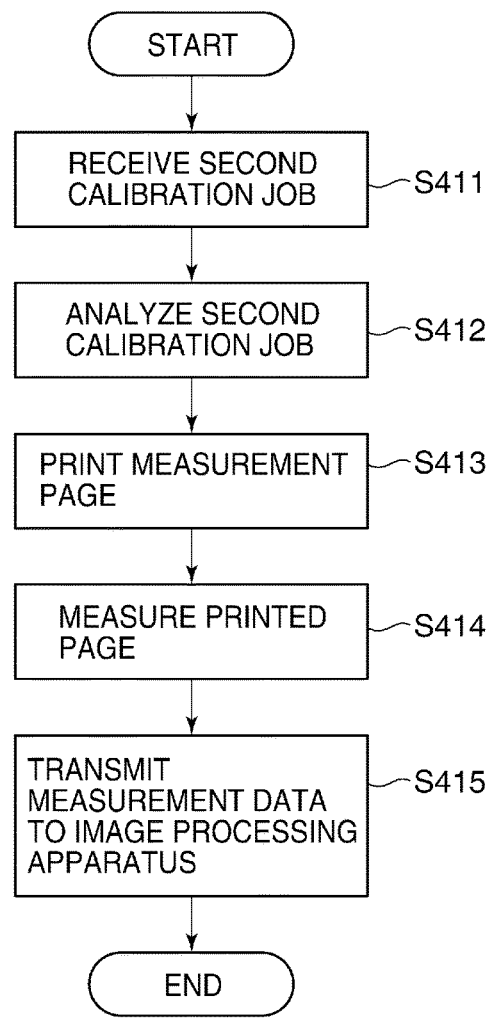
FIG. 4B is a flowchart of a measurement data generation and transmission process performed by the image forming apparatus for the second calibration process.

FIG. 4B is a flowchart of a measurement data generation and transmission process performed by the image forming apparatus 100 as part of the second calibration process. This measurement data generation and transmission process is realized by the CPU 111 executing an associated program stored in the HDD 114 of the image forming apparatus 100 and loaded into the RAM 113. The measurement data generation and transmission process is started in response to reception, by the data transmission and reception section 205 of the image forming apparatus 100, of the second calibration job transmitted in the step S403.

In a step S411, the data transmission and reception section 205 receives the second calibration job. In a step S412, the job analysis section 202 analyzes the second calibration job, and determines the print settings. In a step S413, the job processing section 203 performs necessary processing, and the print processing execution section 204 prints the measurement page based on the second calibration job. In a step S414, the print processing execution section 204 measures the image patterns formed on a sheet by printing the measurement page, using the sensor 123. In a step S415, the data transmission and reception section 205 transmits the measurement data acquired by the sensor 123 to the image processing apparatus 101. Note that the measurement data transmitted in the step S415 is received by the image processing apparatus 101 in the step S404 in FIG. 4A.

Figure 5:
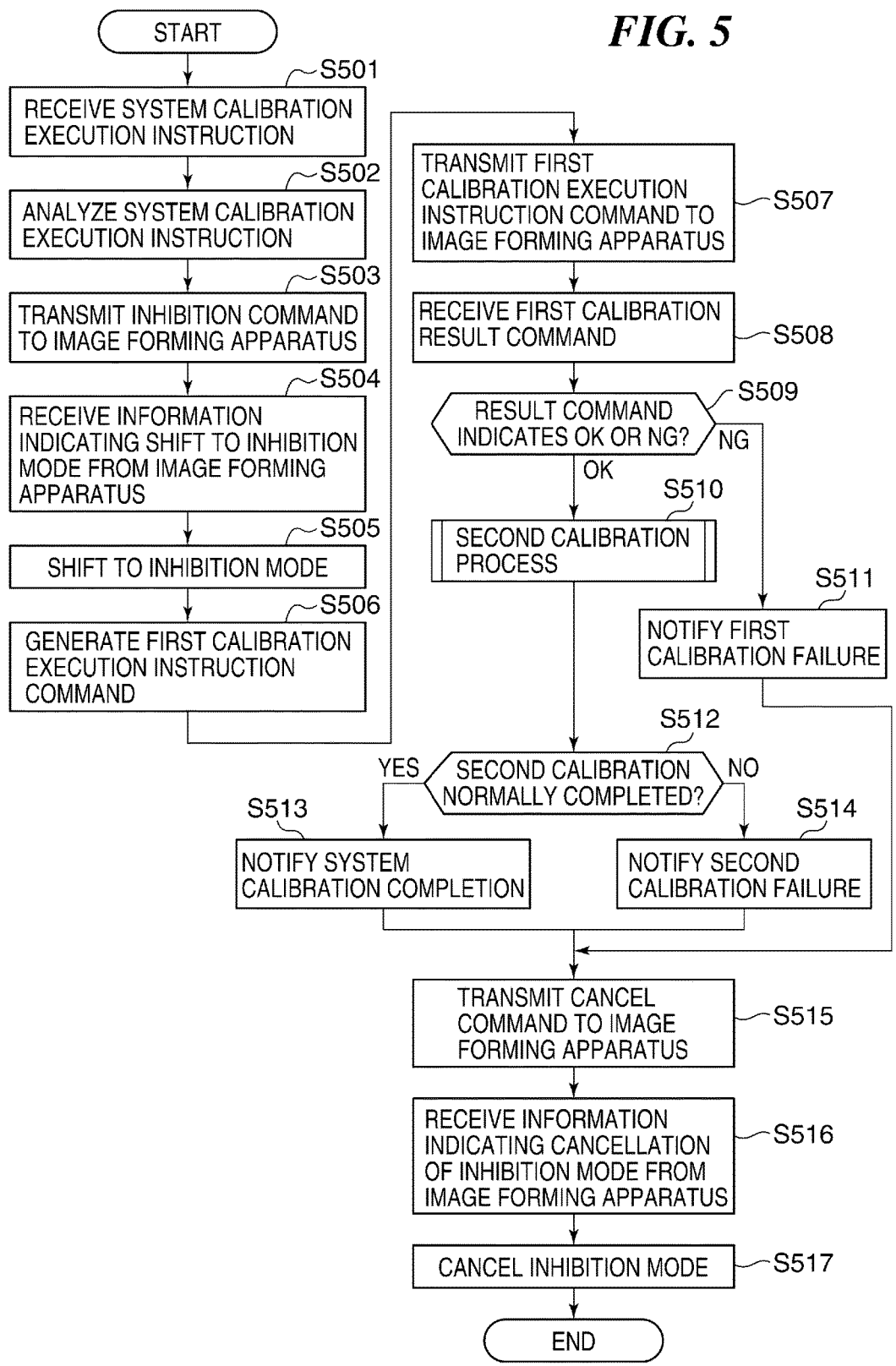
FIG. 5 is a flowchart of part of a system calibration process, which is performed by the image processing apparatus.

Next, the system calibration process will be described with reference to FIGS. 5 to 9. FIG. 5 is a flowchart of part of the system calibration process, which is performed by the image processing apparatus 101. This process part is realized by the CPU 141 executing an associated program stored in the HDD 144 of the image processing apparatus 101 and loaded into the RAM 143. The process part is started in response to reception, by the execution section 217, of an instruction for executing the system calibration process.

FIG. 6 is a diagram showing an example of the system calibration setting information. This setting information 601 is stored in the HDD of each of the image forming apparatus 100 and the image processing apparatus 101. The setting information 601 is managed by the information management section 207 of the image forming apparatus 100 and the information management section 216 of the image processing apparatus 101. The setting information 601 stored in each apparatus is updated via the data transmission and reception section 205 or 214, as required. In the setting information 601, the second calibration settings 312 and the first calibration settings 302 are associated with system calibration setting names 602, respectively.

Figure 7:
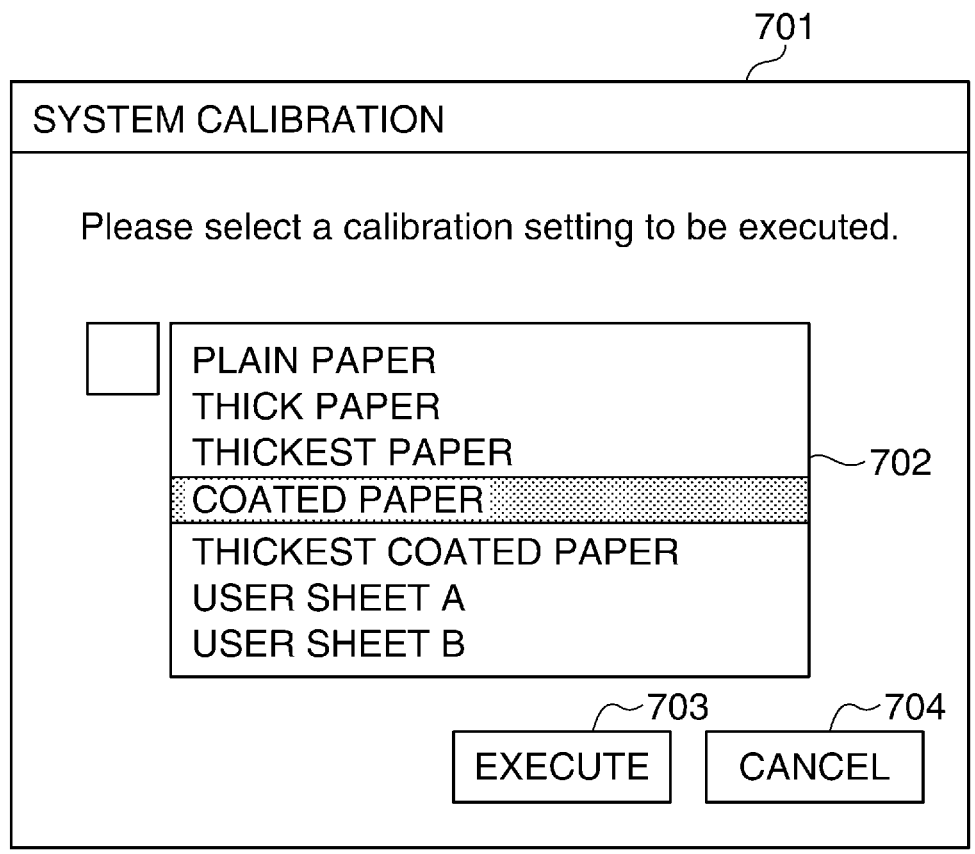
FIG. 7 is a diagram showing an example of a screen for receiving a system calibration execution instruction.

FIG. 7 is a diagram showing an example of a screen for receiving a system calibration execution instruction. The reception screen, denoted by reference numeral 701, is controlled by the UI controller 211, and is displayed on the display section 152 of the operation unit 150 of the image processing apparatus 101. The reception screen 701 displays a list 702. The list 702 is a list of the setting information 601 for which the system calibration can be executed. The UI controller 211 reads out the list of the setting information 601 from the information management section 216, and displays the read list on the list 702. When an operator selects a calibration setting desired to be applied via the input section 151 and presses an execution button 703, the execution section 217 starts the part of the system calibration process, shown in FIG. 5, which is performed by the image processing apparatus 101. On the other hand, when a cancel button 704 is pressed, the UI controller 211 closes the reception screen 701, and terminates the reception state.

In the case of the illustrated example, the execution instruction is received from the operation unit 150 of the image processing apparatus 101. This is not limitative, but for example, the UI controller 201 of the image forming apparatus 100 may cause the same screen as the reception screen 701 to be displayed on the operation unit 124 to receive an input of the execution instruction from the input section 125. Alternatively, the client PC 102 connected to the image processing apparatus 101 via the network 106 may cause the same screen as the reception screen 701 to be displayed on an operation unit, not shown, thereof to receive an input of the execution instruction. In these cases, the execution instruction transmitted via the data transmission and reception section 205 or the like is received by the execution section 217 of the image processing apparatus 101.

In a step S501 in FIG. 5, the execution section 217 receives a system calibration execution instruction via the UI controller 211. In a step S502, the execution section 217 analyzes information of the received system calibration execution instruction. Then, the execution section 217 determines a first calibration setting 302 and a second calibration setting 312 out of the list of the setting information 601. In a step S503, the execution section 217 generates an "inhibition command" for inhibiting execution of a non-calibration job, and instructs the data transmission and reception section 214 to transmit the inhibition command to the image forming apparatus 100.

In a step S504, the execution section 217 receives, from the image forming apparatus 100, information indicating that the operation mode of the image forming apparatus 100 has been shifted to an "inhibition mode" for inhibiting execution of non-calibration jobs. This information is transmitted in a step S803 in FIG. 8, described hereinafter. In a step S505, the execution section 217 instructs the job management section 212 to shift the operation mode of the image processing apparatus 101, similarly to the image forming apparatus 100, to an "inhibition mode" for inhibiting execution of non-calibration jobs. More specifically, the job management section 212 turns on an inhibition mode management flag, not shown, in the HDD 144.

In a step S506, the execution section 217 generates a first calibration execution instruction command. The first calibration execution instruction command includes the first calibration setting 302 to be applied to the first calibration, which is determined in the step S502. In a step S507, the execution section 217 transmits the execution instruction command generated in the step S506 to the image forming apparatus 100 via the data transmission and reception section 214. In a step S508, the execution section 217 receives a first calibration result command from the image forming apparatus 100. This result command is determined by the processing performed by the image processing apparatus 101, and is transmitted therefrom in a step S809 in FIG. 8, described hereinafter. If the first calibration process is normally completed, the result command is received via the data transmission and reception section 214, as a command indicative of OK, whereas if not, as a command indicative of NG. In a step S509, the execution section 217 checks the received first calibration result command, and if the result command indicates OK, the execution section 217 proceeds to a step S510, whereas if the result command indicates NG, the execution section 217 proceeds to a step S511.

In the step S511, the execution section 217 displays a notification to the operator on the display section 152 via the UI controller 211, to the effect that the first calibration has failed. After that, the process proceeds to a step S515. In the step S510, the execution section 217 performs the second calibration process (see FIG. 4A). The second calibration process is performed by the execution section 215, as described above. After that, in a step S512, the execution section 217 determines whether or not the second calibration process has been normally completed in the step S510. If the second calibration process has been normally completed, the execution section 217 proceeds to a step S513, whereas if not, the execution section 217 proceeds to a step S514.

In the step S513, the execution section 217 instructs the UI controller 211 to notify the operator of completion of the system calibration, and proceeds to the step S515. In the step S514, the execution section 217 instructs the UI controller 211 to notify the operator of the failure of the system calibration, and proceeds to the step S515. In the step S515, the execution section 217 generates a "cancel command" for canceling inhibition of execution of non-calibration jobs, and instructs the data transmission and reception section 214 to transmit the cancel command to the image forming apparatus 100. In a step S516, the execution section 217 receives information indicating that the inhibition mode of the image forming apparatus 100 has been cancelled, from the image forming apparatus 100. This information is transmitted in a step S812 in FIG. 8, described hereinafter. In a step S517, the execution section 217 instructs the job management section 212 to cancel the inhibition mode, and terminates the process in FIG. 5.

Figure 8:
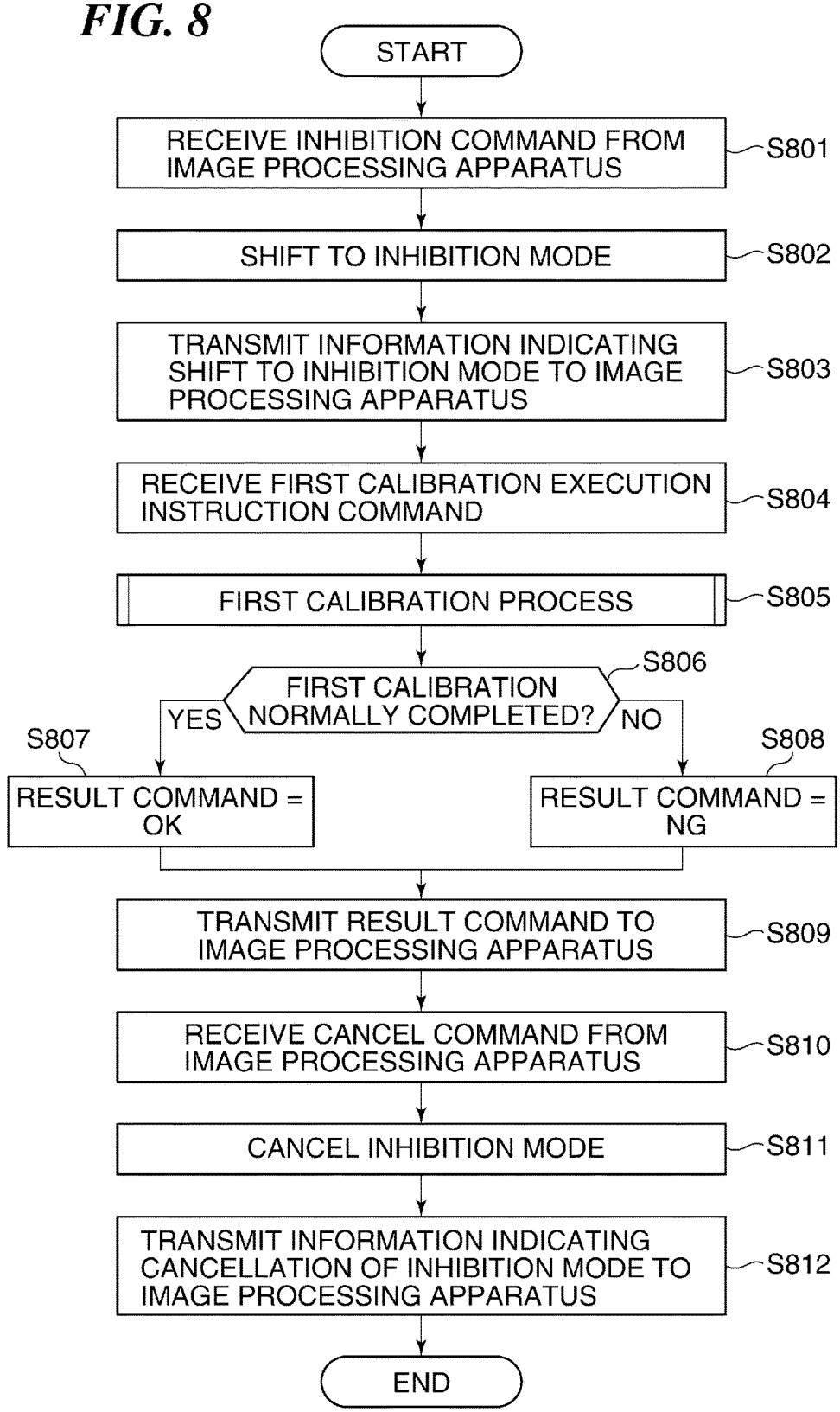
FIG. 8 is a flowchart of part of the system calibration process, which is performed by the image forming apparatus.

FIG. 8 is a flowchart of part of the system calibration process, which is performed by the image forming apparatus 100. This process part is realized by the CPU 111 executing an associated program stored in the HDD 114 of the image forming apparatus 100 and loaded into the RAM 113. The process part is performed by the execution section 206, and is started in response to reception, by the data transmission and reception section 205 of the image forming apparatus 100, of the inhibition command transmitted from the image processing apparatus 101 in the step S503 in FIG. 5.

In a step S801, the execution section 206 receives the inhibition command from the image processing apparatus 101. In a step S802, the execution section 206 instructs the job management section 208 to shift the operation mode of the image forming apparatus 100 to the inhibition mode. More specifically, the job management section 208 turns on an inhibition mode management flag, not shown, in the HDD 114.

In the step S803, the execution section 206 instructs the data transmission and reception section 214 to transmit information indicating that the operation mode of the image forming apparatus 100 has been shifted to the inhibition mode, to the image processing apparatus 101. In a step S804, the execution section 206 receives the first calibration execution instruction command from the image processing apparatus 101. This command is transmitted in the step S507 in FIG. 5. In a step S805, the execution section 206 performs a first calibration process. The first calibration process is performed by the execution section 206, as described hereinafter with reference to FIG. 9.

In a step S806, the execution section 206 determines whether or not the first calibration process in the step S805 has been normally completed. As a case where the first calibration has not been normally completed, it is possible to envisage a case where a failure of the sensor 123, a paper-out error, a jam, or the like, has occurred. In other words, the case where the first calibration has not been normally completed is a case where a result of the first calibration is not obtained. Therefore, whether or not the first calibration has been normally completed can be determined depending on whether or not a result of the first calibration has been normally stored in a step S905 in FIG. 9, described hereinafter, i.e. whether or not the first calibration correction LUT has been successfully stored in the HDD 114. If it is determined in the step S806 that the first calibration has been normally completed, the execution section 206 sets the first calibration result command to OK (step S807), whereas if not, the execution section 206 sets the first calibration result command to NG (step S808). Next, in the step S809, the execution section 206 transmits the first calibration result command to the image processing apparatus 101 via the data transmission and reception section 205.

In a step S810, the execution section 206 receives the cancel command from the image processing apparatus 101. This cancel command is transmitted in the step S515 in FIG. 5. In a step S811, the execution section 206 instructs the job management section 208 to cancel the inhibition mode. In the step S812, the execution section 206 instructs the data transmission and reception section 214 to transmit the information indicating that the inhibition mode of the image forming apparatus 100 has been cancelled, to the image processing apparatus 101, and terminates the part of the system calibration process in FIG. 8 by the image forming apparatus 100.

Figure 9:
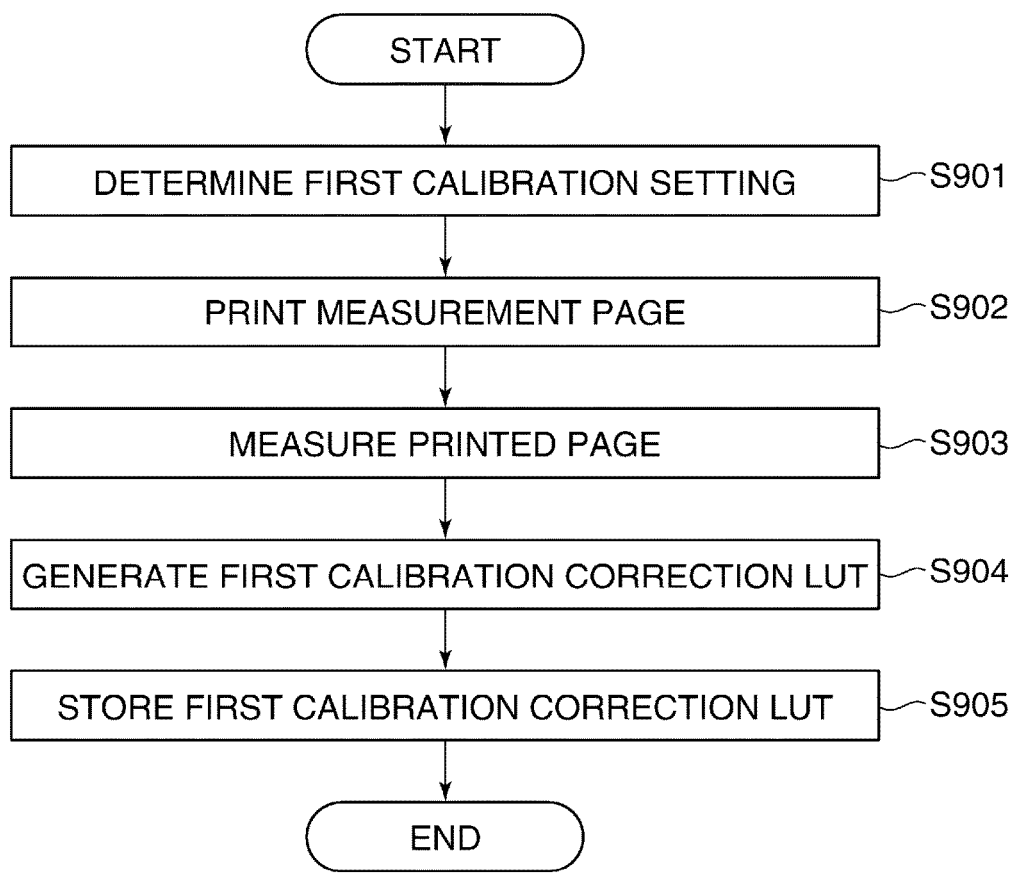
FIG. 9 is a flowchart of a first calibration process performed by the image forming apparatus in a step of the system calibration process.

FIG. 9 is a flowchart of the first calibration process performed by the image forming apparatus 100. This process is performed in the step S805 in FIG. 8. The first calibration process is realized by the CPU 111 executing an associated program stored in the HDD 114 of the image forming apparatus 100 and loaded into the RAM 113.

First, in a step S901, the execution section 206 determines a first calibration setting based on the first calibration execution instruction command received from the image processing apparatus 101. In a step S902, the print processing execution section 204 prints a measurement page based on the first calibration job. In a step S903, the print processing execution section 204 measures the image patterns formed on a sheet by printing the measurement page, using the sensor 123. In a step S904, the execution section 206 generates the first calibration correction LUT using the measurement data and the correction target information. In the step S905, the execution section 206 stores the generated first calibration correction LUT in the HDD 114, and notifies the information management section 207 of information of the first calibration correction LUT. The information management section 207 manages the information of the first calibration setting based on the notified information.

Next, the description will be given of processing for sharing the setting of whether or not to receive a print job (particularly, a non-calibration job) during the system calibration process, between the image processing apparatus 101 and the image forming apparatus 100, with reference to FIGS. 10A to 10F, and 11A to 11D.

Figure 10A:
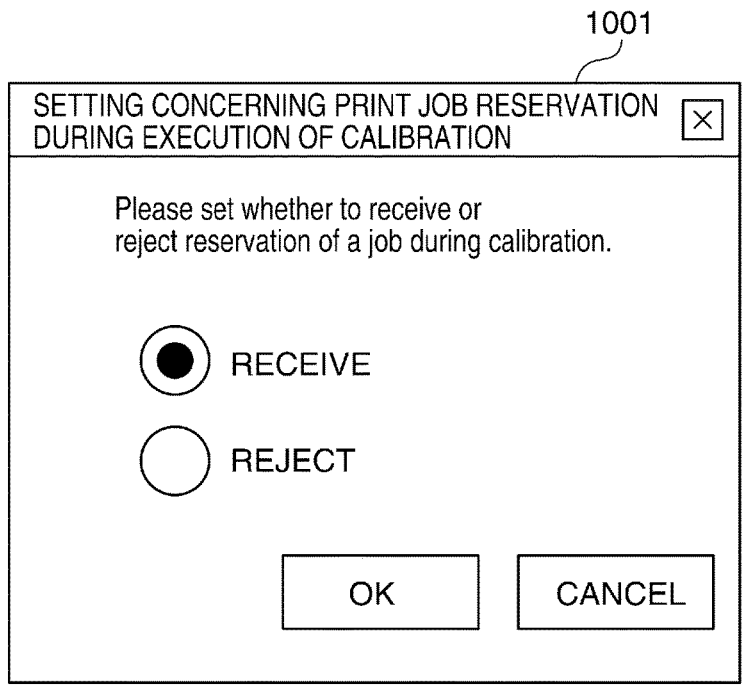
FIG. 10A is a diagram showing an example of a setting screen displayed on a display section of the image processing apparatus, for making a setting whether to receive or reject print job reservation.

Screens displayed on the image processing apparatus 101 will be described with reference to FIGS. 10A to 10C. FIG. 10A is a diagram showing an example of a setting screen displayed on a display section of the image processing apparatus 101, for making a setting whether to receive or reject print job reservation during the system calibration. This setting screen, denoted by reference numeral 1001, is controlled by the UI controller 211, and is displayed on the display section 152 of the operation unit 150 of the image processing apparatus 101. The setting screen 1001 is displayed e.g. when a system calibration execution instruction is received. When the operator selects a radio button for "receive", and presses an "OK" button, the UI controller 211 instructs the job management section 212 to store the setting of "receive" in the HDD 144. On the other hand, when the operator selects a radio button for "reject", and presses the "OK" button, the UI controller 211 instructs the job management section 212 to store the setting of "reject" in the HDD 144.

Figure 10B:
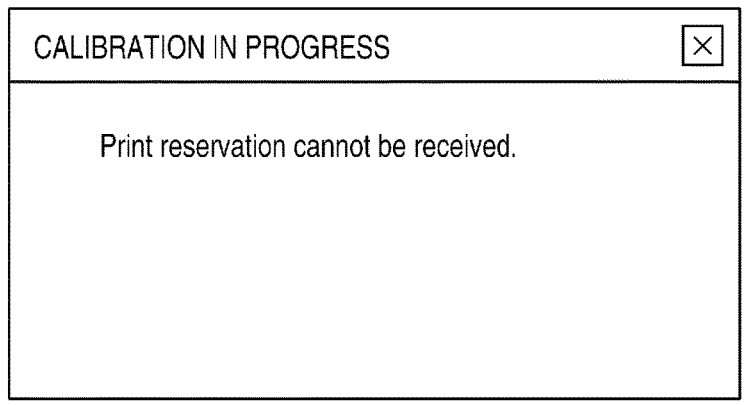
FIG. 10B is a diagram showing an example of a notification screen displayed on the display section of the image processing apparatus, for notifying that a non-calibration job cannot be reserved.
Figure 10C:
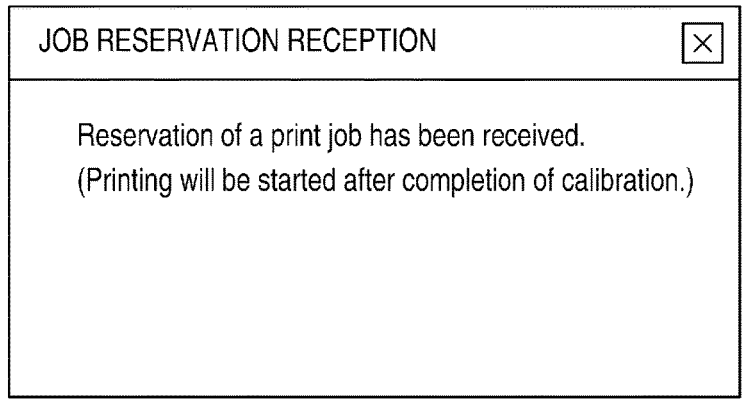
FIG. 10C is a diagram showing an example of a notification screen displayed on the display section of the image processing apparatus, for notifying that reservation of a non-calibration job has been received and execution of processing of the non-calibration job is held.

FIG. 10B is a diagram showing a screen for notifying the operator that a non-calibration job cannot be reserved during the system calibration process. FIG. 10C is a diagram showing a screen notifying the operator that reservation of a non-calibration job is received during the system calibration process and execution of processing of the non-calibration job is held. These notification screens can be displayed on the display section 152 in a process in FIG. 12A, described hereinafter.

Figure 10D:
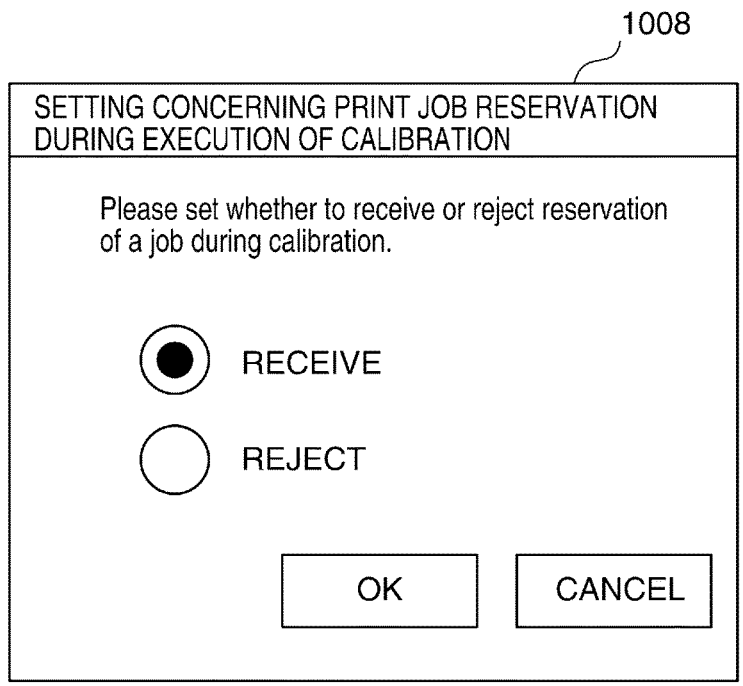
FIG. 10D is a diagram showing an example of a setting screen displayed on a display section of the image forming apparatus, for making a setting whether to receive or reject print job reservation.

Screens displayed on the image forming apparatus 100 will be described with reference to FIGS. 10D to 10F. FIG. 10D is a diagram showing an example of a setting screen displayed on the image forming apparatus 100, for making a setting whether to receive or reject print job reservation during the system calibration. This setting screen, denoted by reference numeral 1008, is controlled by the UI controller 201, and is displayed on the display section 126 of the operation unit 124 of the image forming apparatus 100. The setting screen 1008 is displayed e.g. when an inhibition command is received from the image processing apparatus 101. When the operator selects a radio button for "receive", and presses an "OK" button, the UI controller 201 instructs the job management section 208 to store the setting of "receive" in the HDD 114. On the other hand, when the operator selects a radio button for "reject", and presses the "OK" button, the UI controller 201 instructs the job management section 208 to store the setting of "reject" in the HDD 114.

Figure 10E:
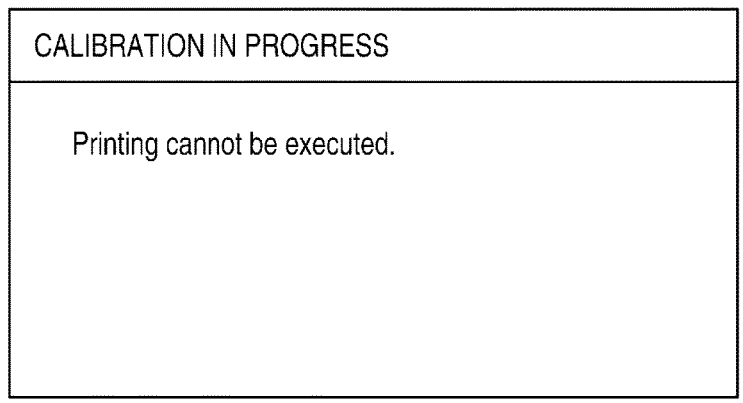
FIG. 10E is a diagram showing an example of a notification screen displayed on the display section of the image forming apparatus, for notifying that a non-calibration job cannot be processed.
Figure 10F:
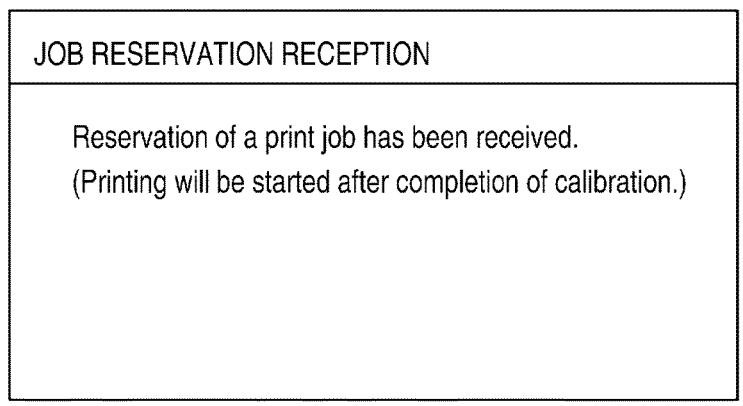
FIG. 10F is a diagram showing an example of a notification screen displayed on the display section of the image forming apparatus, for notifying that reservation of a non-calibration job has been received and execution of processing of the non-calibration job is held.

FIG. 10E is a diagram showing a screen notifying the operator that a non-calibration job cannot be processed during the system calibration process. FIG. 10F is a diagram showing a screen notifying the operator that reservation of a non-calibration job is received during the system calibration process and execution of processing of the non-calibration job is held. These notification screens can be displayed on the display section 126 in a process in FIG. 14A, described hereinafter.

As described above, the operator can set how to handle a non-calibration job instructed from each of the image processing apparatus 101 and the image forming apparatus 100 during the system calibration process, on each apparatus. Further, these settings are shared between the image processing apparatus 101 and the image forming apparatus 100, by performing setting sharing processes shown in FIGS. 11A to 11D.

Figure 11A:
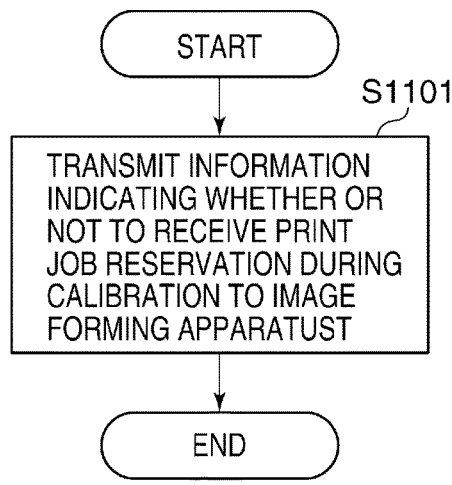
FIG. 11A is a flowchart of a setting sharing process performed by the image processing apparatus.
Figure 11B:
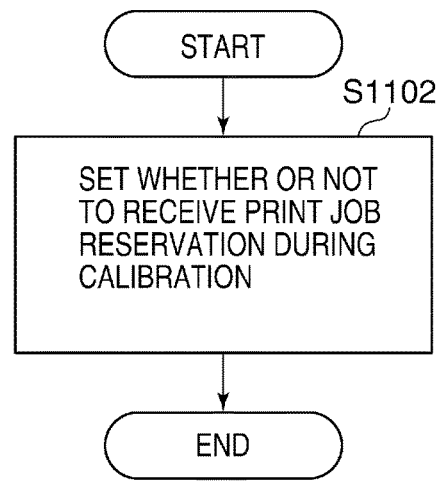
FIG. 11B is a flowchart of a setting sharing process performed by the image forming apparatus.
Figure 11C:
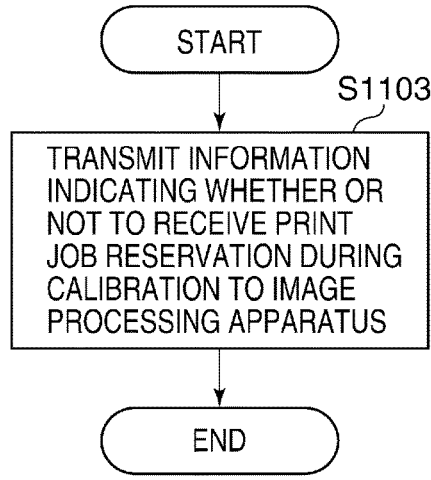
FIG. 11C is a flowchart of another setting sharing process performed by the image forming apparatus.
Figure 11D:
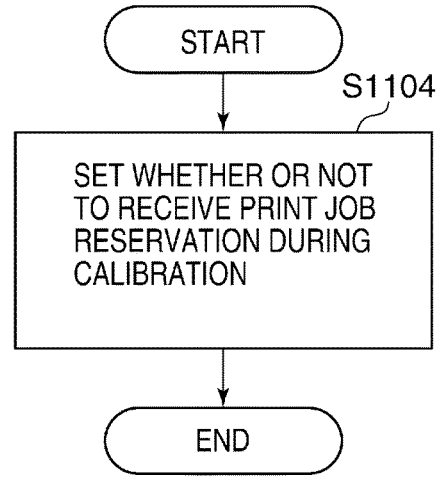
FIG. 11D is a flowchart of another setting sharing process performed by the image processing apparatus.

FIGS. 11A and 11D are flowcharts of the setting sharing processes performed by the image processing apparatus 101. These setting sharing processes are realized by the CPU 141 executing respective associated programs stored in the HDD 144 of the image processing apparatus 101 and loaded into the RAM 143. FIGS. 11B and 11C are flowcharts of setting sharing processes performed by the image forming apparatus 100. These setting sharing processes are realized by the CPU 111 executing associated programs stored in the HDD 114 of the image forming apparatus 100 and loaded into the RAM 113.

The setting sharing process in FIG. 11A is started when the setting of "receive" or "reject", which is a setting concerning print job reservation during execution of the calibration, is stored in the HDD 144 of the image processing apparatus 101. In a step S1101, the job management section 212 acquires setting concerning print job reservation during execution of the calibration, and instructs the data transmission and reception section 214 to transmit the acquired setting to the image forming apparatus 100. The setting sharing process in FIG. 11B is started when the data transmission and reception section 205 of the image forming apparatus 100 receives the setting concerning print job reservation from the image processing apparatus 101. In a step S1102, the job management section 208 receives the setting concerning print job reservation from the data transmission and reception section 205, and stores the received setting in the HDD 114.

The setting sharing process in FIG. 11C is started when the setting of "receive" or "reject", which is a setting concerning print job reservation during execution of the calibration, is stored in the HDD 114. In a step S1103, the job management section 208 acquires the setting concerning print job reservation during execution of the calibration, and instructs the data transmission and reception section 205 to transmit the acquired setting to the image processing apparatus 101. The setting sharing process in FIG. 11D is started when the data transmission and reception section 214 of the image processing apparatus 101 receives the setting concerning print job reservation from the image forming apparatus 100. In a step S1104, the job management section 212 receives the setting concerning print job reservation from the data transmission and reception section 214, and stores the received setting in the HDD 144.

As described above, the image processing apparatus 101 and the image forming apparatus 100 each can make a setting whether to receive or reject print job reservation during execution of the system calibration, and can notifying each other of a setting concerning print job reservation to thereby synchronize the state of the setting with each other.

Next, a non-calibration job-handling process performed when execution of a print job (particularly, a non-calibration job) is instructed during execution of the system calibration will be described with reference to FIGS. 10A to 10F, and FIGS. 12A to 14B.

Figure 12A:
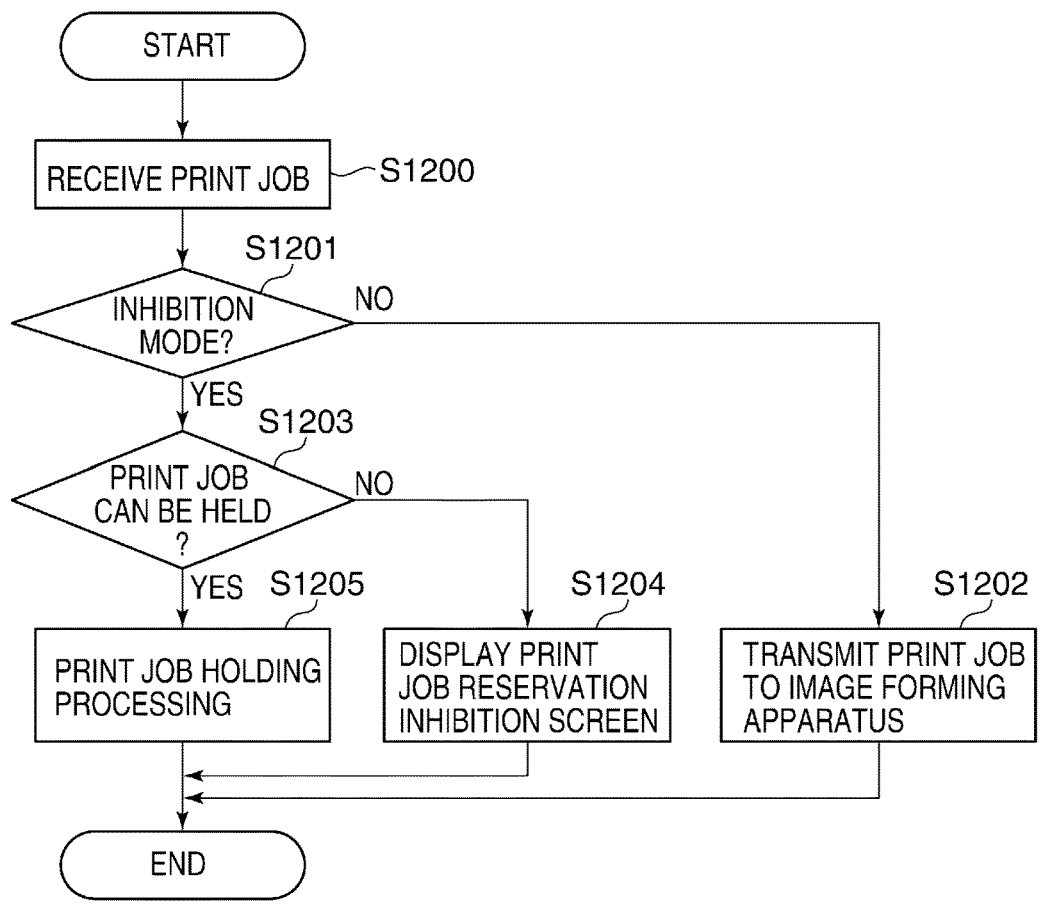
FIG. 12A is a flowchart of a non-calibration job-handling process performed by the image processing apparatus.

FIG. 12A is a flowchart of the non-calibration job-handling process performed by the image processing apparatus 101. This non-calibration job-handling process is realized by the CPU 141 executing an associated program stored in the HDD 144 of the image processing apparatus 101 and loaded into the RAM 143. The non-calibration job-handling process is started when execution of a non-calibration job is instructed to the image processing apparatus 101.

In a step S1200, the job management section 212 receive a non-calibration job (print job in the illustrated example). In a step S1201, the job management section 212 determines whether or not the operation mode of the image processing apparatus 101 is the inhibition mode, by checking the inhibition mode management flag in the HDD 144. If the operation mode is the inhibition mode, the job management section 212 proceeds to a step S1203, whereas if not, the job management section 212 proceeds to a step S1202. In the step S1202, since it is unnecessary to inhibit processing of the non-calibration job, the job management section 212 instructs the data transmission and reception section 214 to transmit the received print job to the image forming apparatus 100.

In the step S1203, it is considered that the system calibration process is being executed, and hence the job management section 212 checks a setting concerning print job reservation whether to receive or reject a non-calibration job, which is stored in the HDD 144. Then, the job management section 212 determines, based on the setting concerning print job reservation, whether or not it is possible to receive and hold the non-calibration job. If the setting concerning print job reservation is "receive", it is determined that it is possible to hold the non-calibration job, and the job management section 212 proceeds to a step S1205, whereas if the setting concerning print job reservation is "reject", it is determined that it is impossible to hold the non-calibration job, and the job management section 212 proceeds to a step S1204.

In the step S1204, the job management section 212 instructs the UI controller 211 to display the screen notifying that a non-calibration job cannot be reserved (see FIG. 10B) on the display section 152. This enables the operator to know that the non-calibration job cannot be reserved because the system calibration process is being executed.

In the step S1205, the job management section 212 performs processing for holding the received non-calibration job. In this holding processing, first, the job management section 212 instructs the UI controller 211 to display the screen notifying that execution of processing of the received non-calibration job is held (see FIG. 10C) on the display section 152. This enables the operator to know that although the system calibration process is being executed, reservation of the non-calibration job has been received, but execution of processing of the received non-calibration job is held. Further, in the holding processing, the job management section 212 also performs processing for storing a list 1301 shown in FIG. 13A.

Figure 13A:
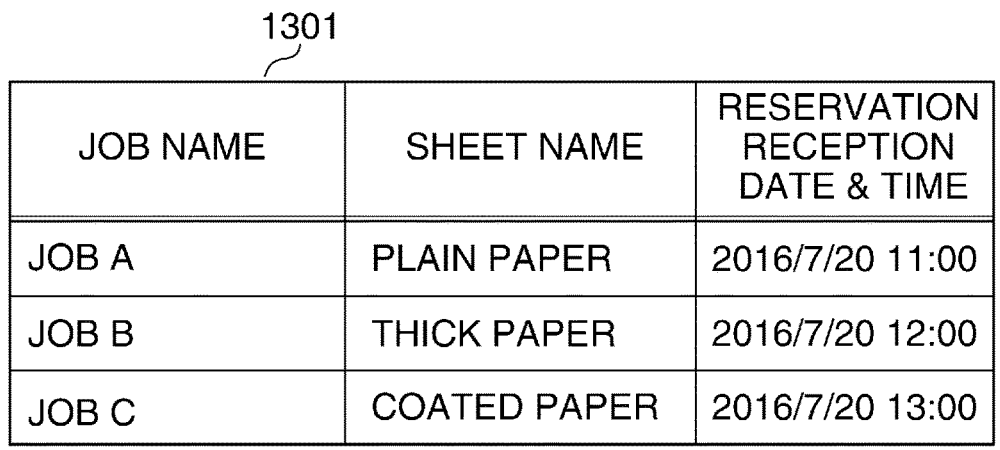
FIG. 13A is a diagram showing a list of print jobs held in the image processing apparatus.

FIG. 13A is a diagram showing the list 1301 for managing print jobs received and held during the system calibration process. This list 1301 is stored in the HDD 144 and is updated by the job management section 212. The job management section 212 stores a received print job in the HDD 144, and registers information of the received print job in the list 1301.

Figure 12B:
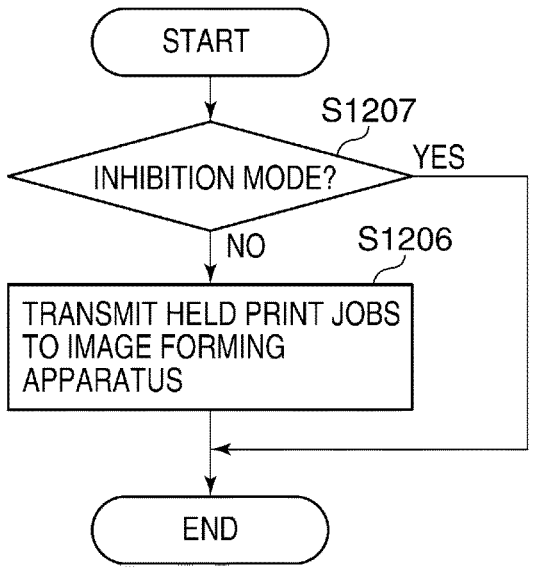
FIG. 12B is a flowchart of a held job transmission process performed by the image processing apparatus.

FIG. 12B is a flowchart of a held job transmission process. This held job transmission process is realized by the CPU 141 executing an associated program stored in the HDD 144 of the image processing apparatus 101 and loaded into the RAM 143. The held job transmission process is performed at predetermined time intervals after the holding processing in the step S1205 is performed.

In a step S1207, the job management section 212 determines whether or not the operation mode of the image processing apparatus 101 is the inhibition mode, by checking the inhibition mode management flag in the HDD 144. If the operation mode is the inhibition mode, the job management section 212 terminates the held job transmission process in FIG. 12B, whereas if the operation mode is not the inhibition mode, the job management section 212 proceeds to a step S1206. In the step S1206, the job management section 212 accesses the list 1301 (see FIG. 13A), and transmits (inputs) the print jobs to the image forming apparatus 100 in an order of date and time in the list 1301 at which reservation is received. Then, the job management section 212 deletes the transmitted print jobs from the list 1301, and terminates the held job transmission process in FIG. 12B. Therefore, the non-calibration jobs which have been reserved are transmitted after canceling the inhibition mode.

Figure 14A:
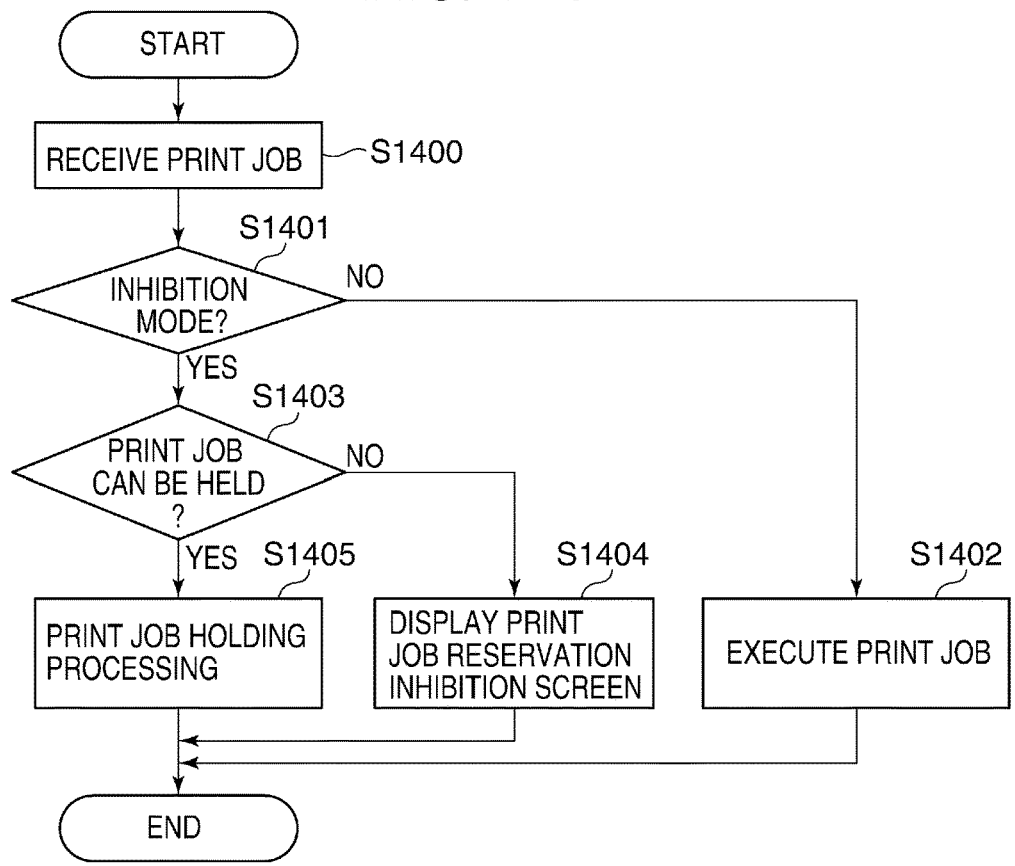
FIG. 14A is a flowchart of a non-calibration job-handling process performed by the image forming apparatus.

FIG. 14A is a flowchart of a non-calibration job-handling process performed by the image forming apparatus 100. This non-calibration job-handling process is realized by the CPU 111 executing an associated program stored in the HDD 114 of the image forming apparatus 100 and loaded into the RAM 113. The non-calibration job-handling process is started when execution of a non-calibration job (print job in the illustrated example) is instructed to the image forming apparatus 100.

In a step S1400, the job management section 208 receives a non-calibration job. In a step S1401, the job management section 208 determines whether or not the operation mode of the image forming apparatus 100 is the inhibition mode by checking the inhibition mode management flag in the HDD 114. Then, if the operation mode is the inhibition mode, the job management section 208 proceeds to a step S1403, whereas if not, the job management section 208 proceeds to a step S1402. In the step S1402, since it is unnecessary to inhibit processing of a non-calibration job, the job management section 208 instructs the print processing execution section 204 to execute the received print job.

In the step S1403, since it is considered that the system calibration process is being executed, the job management section 208 checks a setting concerning print job reservation whether to receive or reject a non-calibration job, which is recorded in the HDD 114. Then, the job management section 208 determines whether or not it is possible to receive and hold the non-calibration job based on the setting concerning print job reservation. If the setting concerning print job reservation is "receive", it is determined that it is possible to hold the non-calibration job, and the job management section 208 proceeds to a step S1405, whereas if the setting concerning print job reservation is "reject", it is determined that it is impossible to hold the non-calibration job, and the job management section 208 proceeds to a step S1404. In the step S1404, the job management section 208 instructs the UI controller 201 to display the screen notifying that the non-calibration job cannot be processed (see FIG. 10E) on the display section 126. This enables the operator to know that the non-calibration job cannot be processed during execution of the system calibration process.

In the step S1405, the job management section 208 performs processing for holding the received non-calibration job. In this holding processing, first, the job management section 208 instructs the UI controller 201 to display the screen notifying that execution of processing of the received non-calibration job is held (see FIG. 10F) on the display section 126. This enables the operator to know that although the system calibration process is being executed, reservation of the non-calibration job has been received, but execution of the processing thereof is held. Further, in the holding processing, the job management section 208 also performs processing for storing a list 1302 shown in FIG. 13B.

Figure 13B:
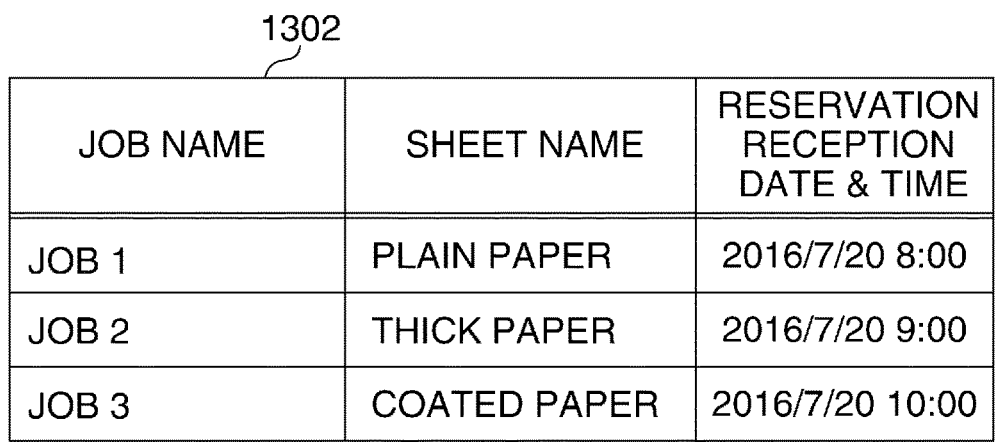
FIG. 13B is a diagram showing a list of print jobs held in the image forming apparatus.

FIG. 13B is a diagram showing the list 1302 for managing print jobs received and held during the system calibration process. This list 1302 is stored in the HDD 114, and is updated by the job management section 208. The job management section 208 stores each received print job in the HDD 114, and registers information of the print job in the list 1302.

Figure 14B:
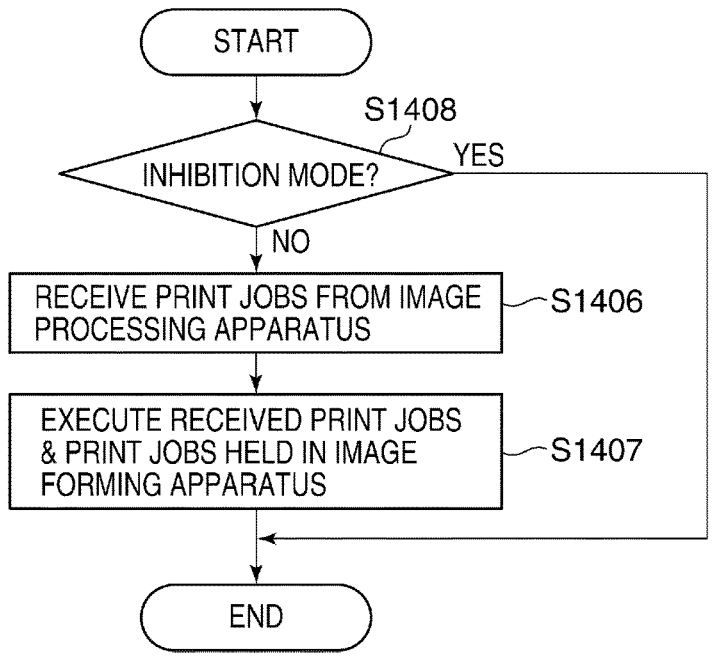
FIG. 14B is a flowchart of a held job execution process performed by the image forming apparatus.

FIG. 14B is a flowchart of a held job execution process. This held job execution process is realized by the CPU 111 executing an associated program stored in the HDD 114 of the image forming apparatus 100 and loaded into the RAM 113. In the illustrated example, the held job is a print job. This held job execution process is performed at predetermined time intervals after execution of the holding processing in the step S1405.

In a step S1408, the job management section 208 determines whether or not the operation mode of the image forming apparatus 100 is the inhibition mode by checking the inhibition mode management flag in the HDD 114. Then, if the operation mode is the inhibition mode, the job management section 208 terminates the held job execution process in FIG. 14B, whereas if not, the job management section 208 proceeds to a step S1406.

In the step S1406, the job management section 208 receives the print jobs held in the image processing apparatus 101. More specifically, the job management section 208 receives the print jobs (non-calibration jobs) transmitted in the step S1206 in FIG. 12B. Then, in a step S1407, the job management section 212 accesses the list 1302 (see FIG. 13B), and confirms the print jobs being held. Then, the job management section 212 instructs the print processing execution section 204 to execute processing of the print jobs (non-calibration jobs) received in the step S1406 and the print jobs (non-calibration jobs) held in the list 1302. The print jobs (non-calibration jobs) held in the list 1302 are executed in an order of date and time in the list 1302 at which reservation is received, and the print jobs which have been executed are deleted from the list 1302. After that, the held job execution process in FIG. 14B is terminated. Therefore, the held print jobs (non-calibration jobs) are executed after canceling the inhibition mode.

According to the present embodiment, when a system calibration instruction is received, the image processing apparatus 101 transmits an inhibition command to the image forming apparatus 100, and shifts the operation mode to the inhibition mode. Then, when the second calibration is completed or a result of execution of the first calibration is received from the image forming apparatus 100, the image processing apparatus 101 transmits a cancel command to the image forming apparatus 100, and cancels the inhibition mode (see FIG. 5). When the image processing apparatus 101 is in the inhibition mode, even if execution of a non-calibration job is instructed to the image processing apparatus 101, the image processing apparatus 101 does not input the non-calibration job to the image forming apparatus 100 (see FIGS. 12A and 12B). This prevents a non-calibration job received by the image processing apparatus 101 from being executed at an interval between respective image adjustment operations performed by the image forming apparatus 100 and the image processing apparatus 101, and therefore, printing which is not associated with calibration is prevented.

Further, the image forming apparatus 100 shifts the operation mode to the inhibition mode in response to reception of the inhibition command from the image processing apparatus 101, and cancels the inhibition mode in response to reception of the cancel command (see FIG. 8). When the image forming apparatus 100 is in the inhibition mode, even if execution of a non-calibration job is instructed to the image forming apparatus 100, the image forming apparatus 100 does not execute the non-calibration job (see FIGS. 14A and 14B). This prevents a non-calibration job received by the image forming apparatus 100 from being executed at an interval between the respective image adjustment operations performed by the image forming apparatus 100 and the image processing apparatus 101, and therefore, printing which is not associated with calibration is prevented.

As described above, it is ensured that the first and second calibrations are sequentially performed, whereby it is possible to preserve normal color tones for a long time period. Therefore, it is possible to preserve the image quality characteristics, such as density-gradation characteristics and color output characteristics, of the image forming system, in an appropriate state.

Further, each of the image processing apparatus 101 and the image forming apparatus 100 is capable of setting whether or not to receive a non-calibration job during the inhibition mode, as a setting concerning print job reservation, in advance (see FIGS. 10A to 10F), and this is very convenient to users. Further, if the setting concerning print job reservation is "receive", in the image processing apparatus 101, an instructed non-calibration job is held, and is input to the image forming apparatus 100 after the inhibition mode is canceled (see FIG. 12B). On the other hand, in the image forming apparatus 100, an instructed non-calibration job is held, and is executed after the inhibition mode is canceled (see FIG. 14B). With these configurations, it is possible to receive a non-calibration job even when the operation mode is the inhibition mode, and execute the received non-calibration job later. Further, if the reservation setting is "reject", an instructed non-calibration job cannot be received by the respective apparatuses, and hence it is possible to reject reception of a non-calibration job during the inhibition mode, and thereby positively avoid inputting and execution of the non-calibration job.

What is more, the setting concerning print job reservation is shared between the two apparatuses by notifying each other of the setting of its own (FIGS. 11A to 11D), and hence the two apparatuses as the system are capable of unifying the handling of whether to hold or reject an instructed non-calibration job. Note that it is not absolutely necessary to share the setting concerning print job reservation.

Further, in a case where a non-calibration job is held and a case where a non-calibration job is rejected, these statuses are notified (see FIGS. 10B, 10C, 10E, and 10F), and hence the operator can grasp the status. Note that from the viewpoint of enabling the operator to grasp the status, the notification may not be performed by display, but may be performed e.g. by voice.

Further, when a system calibration execution instruction is received by the image processing apparatus 101, the first calibration job and the second calibration job are performed by the image forming apparatus 100 and the image processing apparatus 101, respectively, in a coordinated fashion. In doing this, the image forming system determines the calibration settings for the two apparatuses based on the calibration setting information, and hence the operator is not required to determine the calibration settings, whereby it is possible to prevent occurrence of human errors.

Incidentally, to stabilize the image quality, it is only required to avoid printing which is not associated with calibration at an interval between the first calibration performed by the image forming apparatus 100 and the second calibration performed by the image processing apparatus 101 in the system calibration. Therefore, even in the inhibition mode, it is only required to avoid at least a print operation based on a non-calibration job. For example, even when a copy job is held in the image forming apparatus 100 as a non-calibration job, the copy job may be executed up to a scan operation without waiting until the inhibition mode is canceled, and the print operation may be executed after the inhibition mode is canceled. Therefore, in this case, it is only required to configure the "inhibition command" such that even when execution of a non-calibration job is instructed, the inhibition command inhibits at least a print operation to be performed based on the non-calibration job.

Although in making a setting concerning print job reservation, the operator can select between the setting of holding a non-calibration job and the setting of rejecting a non-calibration job, it is not necessarily required to make these settings selectable. For example, the configuration may be such that when an execution instruction of the system calibration is received, a non-calibration job is uniformly held or is uniformly rejected.

Instead of rejecting reception of a non-calibration job, reception itself of the operation by the UI controller 201 and the UI controller 211 may be inhibited.

Note that in FIG. 5, shifting of the operation mode to the inhibition mode (step S505) may be executed at any timing insofar as it is after the step S501 and before the step S507. Further, canceling of the inhibition mode (step S517) may be executed at any timing insofar as it is not before the steps S511, S513, and 514.

Next, a description will be given of a second embodiment of the present invention. In the second embodiment, a process performed when execution of a print job (particularly, a non-calibration job) is instructed from an external apparatus during execution of the system calibration will be described. The present embodiment will be described with reference to FIGS. 15A and 15B, which are added to the first embodiment. Although the client PC 102 is taken as the external apparatus by way of example, this is not limitative.

Figure 15A:
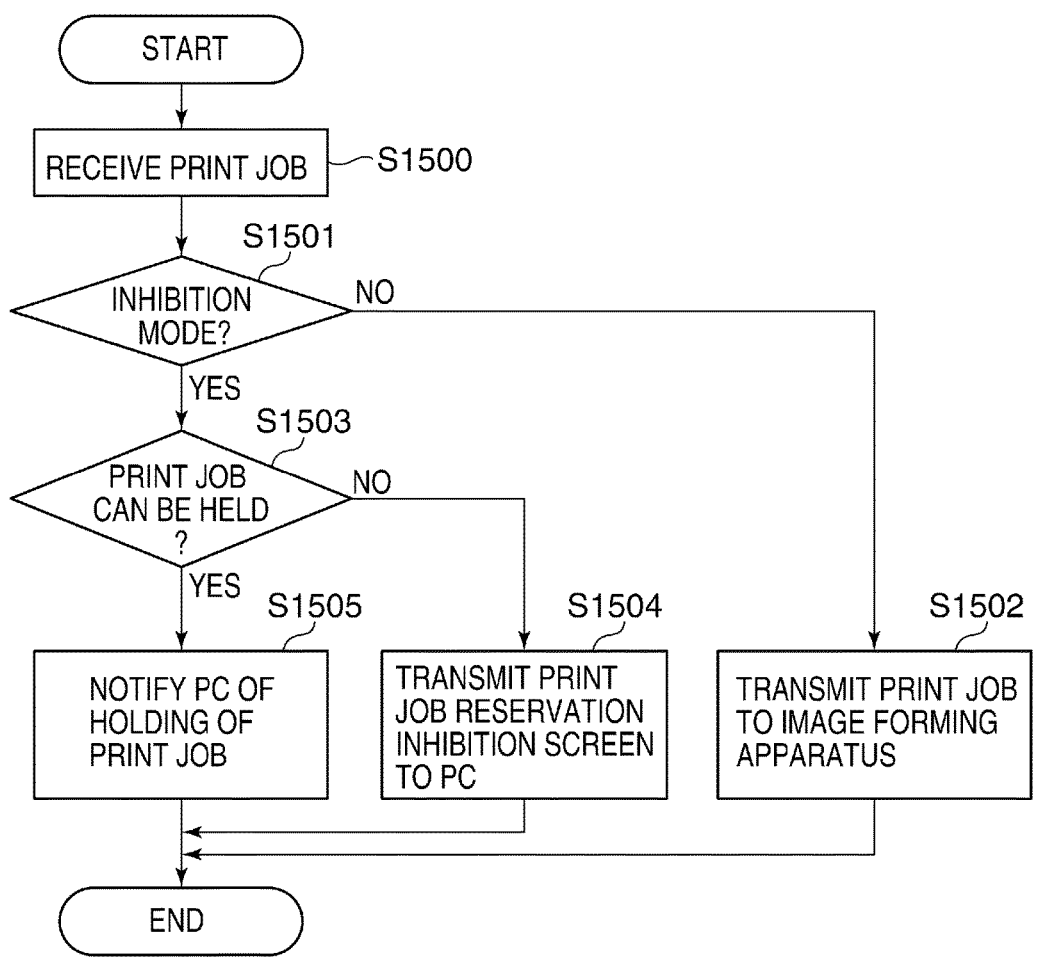
FIG. 15A is a flowchart of a non-calibration job-handling process performed by the image processing apparatus of the image forming system according to a second embodiment of the present invention when a non-calibration job is input from an external apparatus.

FIG. 15A is a flowchart of a non-calibration job-handling process performed by the image processing apparatus 101 when a non-calibration job is input from an external apparatus. This non-calibration job-handling process is realized by the CPU 141 executing an associated program stored in the HDD 144 of the image processing apparatus 101 and loaded into the RAM 143. The non-calibration job-handling process is started when execution of a non-calibration job is instructed from the client PC 102 to the image processing apparatus 101.

In a step S1500, the job management section 212 receives a non-calibration job (print job in the illustrated example) from the client PC 102. In a step S1501, the job management section 212 performs the same processing as in the step S1201 in FIG. 12A. If it is determined in the step S1501 that the operation mode is the inhibition mode, in a step S1503, the job management section 212 performs the same processing as in the step S1203 in FIG. 12A. On the other hand, if it is determined in the step S1501 that the operation mode is not the inhibition mode, in a step S1502, the job management section 212 performs the same processing as in the step S1202 in FIG. 12A, followed by terminating the process in FIG. 15A.

If it is determined in the step S1503 that the non-calibration job cannot be held, the job management section 212 proceeds to a step S1504, whereas if the non-calibration job can be held, the job management section 212 proceeds to a step S1505. In the step S1504, the job management section 212 instructs the data transmission and reception section 214 to transmit information for displaying the screen notifying that the non-calibration job cannot be reserved (see FIG. 10B) to the client PC 102. The client PC 102 having received the information displays the screen for the notification on a display section, not shown, of the client PC 102. This enables the user of the client PC 102 as an instruction source to know that the non-calibration job cannot be reserved because the system calibration process is being executed.

On the other hand, in the step S1505, the job management section 212 performs processing for holding the received non-calibration job. In this holding processing, first, the job management section 212 instructs the data transmission and reception section 214 to transmit information for displaying the screen notifying that execution of processing of the received non-calibration job is held (see FIG. 10C) to the client PC 102. The client PC 102 having received the information causes the screen for the notification to be displayed on the display section, not shown, of the client PC 102. This enables the user of the client PC 102 to know that although the system calibration process is being executed, reservation of the non-calibration job has been received and the job is to be executed later. Further, in the holding processing, the job management section 212 also performs processing for storing the list 1301 shown in FIG. 13A.

Figure 15B:
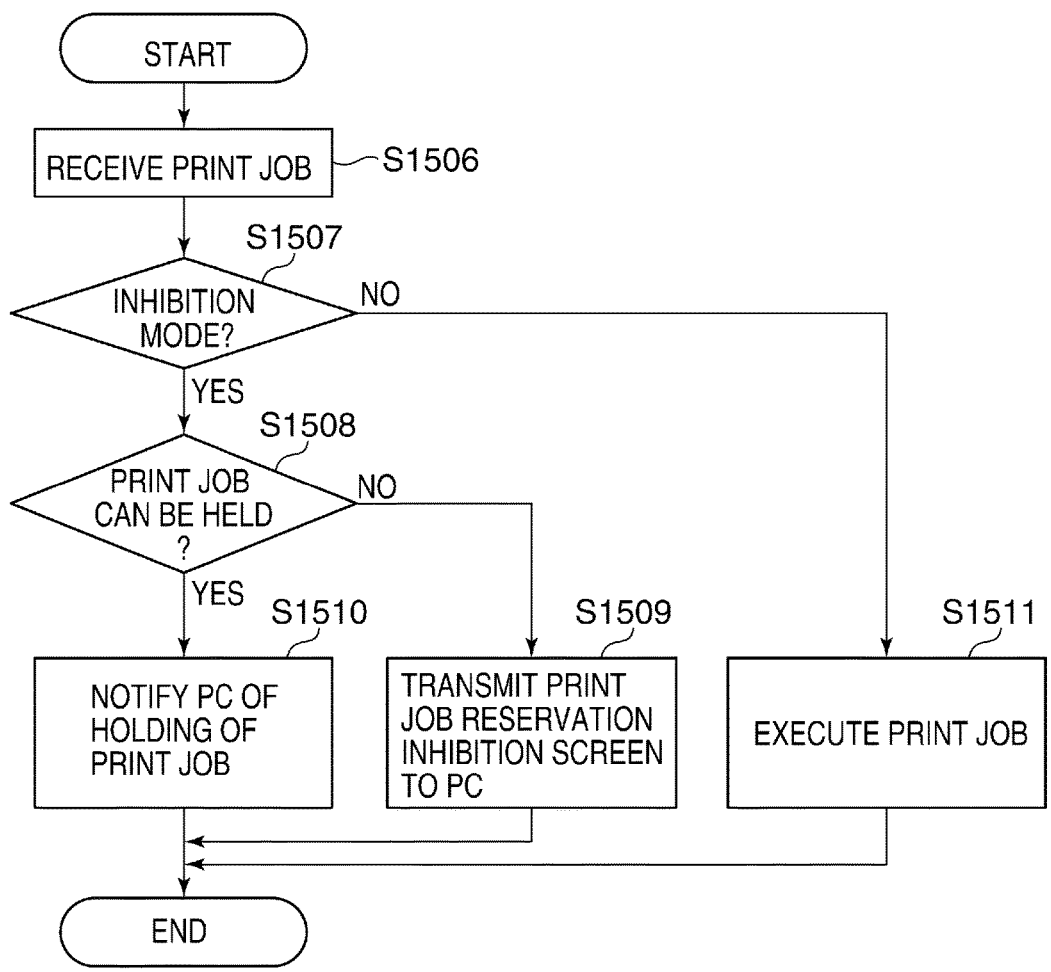
FIG. 15B is a non-calibration job-handling process performed by the image forming apparatus of the image forming system according to the second embodiment when a non-calibration job is input from an external apparatus.

FIG. 15B is a flowchart of a non-calibration job-handling process performed by the image forming apparatus 100 when a non-calibration job is input from an external apparatus. This non-calibration job-handling process in FIG. 15B is realized by the CPU 111 executing an associated program stored in the HDD 114 of the image forming apparatus 100 and loaded into the RAM 113. The non-calibration job-handling process is started when execution of a non-calibration job is instructed from the client PC 102 to the image forming apparatus 100. Note that the present process may be started when execution of a non-calibration job stored in the image forming apparatus 100 is instructed by the user of the client PC 102 operating a UI controller, not shown. Note that it is assumed that the image forming apparatus 100 has been communicably connected to the client PC 102 before performing the present process.

In a step S1506, the job management section 208 receives a non-calibration job from the client PC 102. In a step S1507, the job management section 208 performs the same processing as in the step S1401 in FIG. 14A. In the step S1507, the job management section 208 performs the same processing as in the step S1401 in FIG. 14A. If it is determined in the step S1507 that the operation mode is not the inhibition mode, in a step S1511, the job management section 208 performs the same processing as in the step S1402 in FIG. 14A, followed by terminating the process in FIG. 15B.

If it is determined in the step S1508 that the non-calibration job cannot be held, the job management section 208 proceeds to a step S1509, whereas if the non-calibration job can be held, the job management section 208 proceeds to a step S1510. In the step S1509, the job management section 208 instructs the data transmission and reception section 205 to transmit information for displaying the screen notifying that the non-calibration job cannot be processed (see FIG. 10E) to the client PC 102. The client PC 102 having received the information displays the screen for the notification on the display section, not shown, of the client PC 102. This enables the user of the client PC 102 as an instruction source to know that the non-calibration job cannot be reserved because the system calibration process is being executed.

On the other hand, in the step S1510, the job management section 208 performs processing for holding the received non-calibration job. In this holding processing, first, the job management section 208 instructs the data transmission and reception section 205 to transmit information for displaying the screen notifying that execution of processing of the received non-calibration job is held (see FIG. 10F) to the client PC 102. The client PC 102 having received the information displays the screen for the notification on the display section, not shown, of the client PC 102. This enables the user of the client PC 102 to know that although the system calibration process is being executed, reservation of the non-calibration job has been received and the job is to be executed later. Further, in the holding processing, the job management section 208 also performs processing for storing the list 1302 shown in FIG. 13B.

According to the present embodiment, it is possible to obtain the same advantageous effects, with respect to preservation of the image quality characteristics, such as density-gradation characteristics and color output characteristics, of the image forming system, in an appropriate state Further, in a case where the instruction source of a non-calibration job is an external apparatus as well, it is possible to obtain advantageous effects of holding a non-calibration job even during the inhibition mode, or positively avoiding inputting and execution of a non-calibration job by rejecting reception of the non-calibration job.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-255520 filed Dec. 28, 2016, which is hereby incorporated by reference herein in its entirety.

What is claimed is:

1. An image processing apparatus that is connected to an image forming apparatus, the image processing apparatus comprising:
   at least one memory configured to store instructions; and
   at least one processor configured to execute the instructions stored in the memory to:
      receive a setting indicating whether the image processing apparatus can receive a job during calibration;
      receive an instruction for executing a first calibration;
      transmit, to the image forming apparatus, according to reception of the instruction for executing the first calibration, an inhibition command that shifts an operation mode of the image forming apparatus to an inhibition mode for inhibiting the image forming apparatus from performing a non-calibration print operation based on an instruction for executing a job;
      receive, from the image forming apparatus, information indicating that the image forming apparatus has shifted to the inhibition mode;
      shift, according to the reception of the information indicating that the image forming apparatus has shifted to the inhibition mode, an operation mode of the image processing apparatus to an inhibition mode;
      transmit, to the image forming apparatus, the instruction for executing the first calibration;
      receive, from the image forming apparatus, an instruction for executing a second calibration in succession after the first calibration is executed;
      perform the second calibration; and
      transmit a cancel command for canceling the inhibition mode to the image forming apparatus,
      wherein, in a case where the image processing apparatus is in the inhibition mode and the setting indicates that the image processing apparatus can receive a job during calibration, when an instruction for executing the job is received, the job is stored and not transmitted to the image forming apparatus until the inhibition mode is cancelled in the image forming apparatus.

2. The image processing apparatus according to claim 1, wherein, in a case where the image processing apparatus is in the inhibition mode and the setting indicates that the image processing apparatus can not receive a job during calibration, the instruction for executing the job is rejected.

3. The image processing apparatus according to claim 2, wherein, in the case where the instruction for executing the job is rejected, a notification to this effect is performed.

4. The image processing apparatus according to claim 3, wherein, in a case where the instruction for executing the job is received from an external apparatus, the external apparatus is notified that the job is rejected.

5. The image processing apparatus according to claim 1, wherein, in a case where the the job is stored and not transmitted to the image forming apparatus until the inhibition mode is cancelled in the image forming apparatus, a notification to this effect is performed.

6. The image processing apparatus according to claim 5, wherein, in a case where the instruction for executing the job is received from an external apparatus, the external apparatus is notified that the transmission of the job is held.

7. The image processing apparatus according to claim 1, wherein the inhibition mode of the image processing apparatus is cancelled in response to reception of information from the image forming apparatus indicating that the inhibition mode of the image forming apparatus is cancelled.

8. The image processing apparatus according to claim 1, wherein the job is a job other than a print job necessary for execution of calibration.

9. A method of controlling an image processing apparatus that is connected to an image forming apparatus, the method comprising:
   receiving a setting indicating whether the image processing apparatus can receive a job during calibration;
   receiving an instruction for executing a first calibration;
   transmitting, to the image forming apparatus, according to reception of the instruction for executing the first calibration, an inhibition command that shifts an operation mode of the image forming apparatus to an inhibition mode for inhibiting the image forming apparatus from performing a non-calibration print operation based on an instruction for executing a job;
   receive, from the image forming apparatus, information indicating that the image forming apparatus has shifted to the inhibition mode;
   shifting, according to the reception of the information indicating that the image forming apparatus has shifted to the inhibition mode, an operation mode of the image processing apparatus to an inhibition mode;
   transmitting, to the image forming apparatus, the instruction for executing the first calibration;
   receiving, from the image forming apparatus, an instruction for executing a second calibration in succession after the first calibration is executed;
   performing the second calibration; and
   transmitting a cancel command for canceling the inhibition mode to the image forming apparatus,
   wherein, in a case where the image processing apparatus is in the inhibition mode and the setting indicates that the image processing apparatus can receive a job during calibration, when an instruction for executing the job is received, the job is stored and not transmitted to the image forming apparatus until the inhibition mode is cancelled in the image forming apparatus.

* * * * *